(12) United States Patent
Wang et al.

(10) Patent No.: US 7,826,548 B2
(45) Date of Patent: Nov. 2, 2010

(54) RESOURCE MANAGEMENT IN A WIRELESS COMMUNICATION NETWORK

(75) Inventors: Shu Wang, San Diego, CA (US); Sang Gook Kim, San Diego, CA (US); Young Cheul Yoon, San Diego, CA (US); Soon Yil Kwon, San Diego, CA (US); Li-Hsiang Sun, San Diego, CA (US); Ho Bin Kim, San Diego, CA (US); Suk Woo Lee, San Diego, CA (US); Byung Kwan Yi, San Diego, CA (US)

(73) Assignee: LG Electronics, Inc., Seoul (KR)

( * ) Notice: Subject to any disclaimer, the term of this patent is extended or adjusted under 35 U.S.C. 154(b) by 296 days.

(21) Appl. No.: 12/054,178

(22) Filed: Mar. 24, 2008

(65) Prior Publication Data

US 2009/0022234 A1    Jan. 22, 2009

Related U.S. Application Data

(63) Continuation-in-part of application No. 11/751,512, filed on May 21, 2007.

(60) Provisional application No. 60/801,689, filed on May 19, 2006, provisional application No. 60/896,831, filed on Mar. 23, 2007, provisional application No. 60/909,906, filed on Apr. 3, 2007, provisional application No. 60/910,420, filed on Apr. 5, 2007, provisional application No. 60/896,863, filed on Mar. 23, 2007.

(51) Int. Cl.
 *H04B 7/02* (2006.01)
(52) U.S. Cl. .................................................. 375/267
(58) Field of Classification Search ................. 375/260, 375/261, 267, 299, 302
See application file for complete search history.

(56) References Cited

U.S. PATENT DOCUMENTS 7,088,671 B1    8/2006   Monsen
2004/0009783 A1 1/2004   Miyoshi (Continued)

FOREIGN PATENT DOCUMENTS

EP    1610480    12/2005

(Continued)

OTHER PUBLICATIONS

Moustafa et al. "Efficient Radio Resource Control in Wireless Networks" IEEE Transaction on Wireless Communication, vol. 3, No. 6, Nov. 2004.

(Continued)

*Primary Examiner*—Don N Vo
(74) *Attorney, Agent, or Firm*—Lee, Hong, Degerman, Kang & Waimey

(57) ABSTRACT

A method of transmitting more than one signal in a wireless communication system is provided. The method comprises allocating multiple symbols to a first signal constellation and a second signal constellation, wherein the first signal constellation refers to base layer signals and the second signal constellation refers to enhancement layer signals; modulating the multiple symbols of the first signal constellation and the second signal constellation; and transmitting the modulated symbols, wherein configuration information used for modulating the multiple symbols is provided in a control message.

11 Claims, 26 Drawing Sheets

U.S. PATENT DOCUMENTS

| | | | |
|---|---|---|---|
| 2005/0143085 A1* | 6/2005 | Bi et al. .................. | 455/452.2 |
| 2005/0163243 A1* | 7/2005 | Chung et al. ............... | 375/267 |
| 2006/0029157 A1 | 2/2006 | Dabak et al. | |
| 2006/0198454 A1* | 9/2006 | Chung et al. ............... | 375/260 |
| 2008/0170640 A1* | 7/2008 | Gao et al. .................. | 375/302 |
| 2009/0316835 A1* | 12/2009 | Walker et al. .............. | 375/320 |

FOREIGN PATENT DOCUMENTS

| | | |
|---|---|---|
| WO | 2005/013530 | 2/2005 |

OTHER PUBLICATIONS

Moustafa et al. "Efficient Radio Resource Control for Manhattan Street Environments" Proceeding of IEEE International Conference on Communications, Apr. 28, 2002.

* cited by examiner

FIG. 29

| Field | Length (bits) |
| --- | --- |
| MessageID | 8 |
| ProtocolSubtype | 16 |
| BroadcastParametersSignature | 16 |
| CompleteListInd | 1 |
| QCISignature | 20 |
| AllReservedInterlaces | 1 |
| BCMCSReservedInterlaces | 0 or 4 |
| RotationalAngleIncluded | 1 |
| RotationalAngle | 0 or 4 |
| NumBOC | 2 |

RESOURCE MANAGEMENT IN A WIRELESS COMMUNICATION NETWORK

CROSS-REFERENCE TO RELATED APPLICATIONS

This application is a continuation-in-part of U.S. application Ser. No. 11/751,512, filed on May 21, 2007, currently pending, which claims the benefit of U.S. Provisional Application No. 60/801,689 filed on May 19, 2006, U.S. Provisional Application No. 60/896,831 filed on Mar. 23, 2007, U.S. Provisional Application No. 60/909,906 filed on Apr. 3, 2007, U.S. Provisional Application No. 60/910,420 filed on Apr. 5, 2007 and U.S. Provisional Application No. 60/896,863 filed on Mar. 23, 2007, the entire contents of all of which are hereby incorporated by reference.

TECHNICAL FIELD

The present invention relates to a method of using wireless resources, and more particularly, to a method of utilizing and manipulating wireless resources for efficient and effective wireless communication.

BACKGROUND

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone system. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3G communication systems are conceptually similar to each other with some significant differences. In a wireless communication system, an effective transmission of data crucial and at the same time, it is important to improve transmission efficiency. To this end, it is important that more efficient ways of transmitting and receiving data are developed.

SUMMARY

A method of transmitting more than one signal in a wireless communication system is provided. The method comprises allocating multiple symbols to a signal constellation comprising multiple layers wherein the signals allocated to a first layer signal constellation refers to base layer signals and the signals allocated to a second layer signal constellation refers to enhancement layer signals; modulating the multiple symbols of the first layer signal constellation and the second layer signal constellation; and transmitting the modulated symbols, wherein configuration information used for modulating the multiple symbols is provided in a control message, when appropriate.

In one embodiment, the control message is transmitted over a control channel. The configuration information may include data indicating that modulation of the multiple symbols is enhanced or data indicating whether a rotation angle used for modulating the multiple symbols is included in the control message. When the configuration information comprises data that indicates that the rotation angle is included in the control message, modulation of the multiple symbols is enhanced according to the rotation angle.

A rotation angle may be used for modulating the multiple symbols may include in the control message. The rotation angle indicates the degree by which initial reference phase for the enhancement layer signals is modulated.

In accordance with another embodiment, a method of notifying a receiver of modulating data in a wireless communication network comprises transmitting over a control channel a control message including configuration information about modulating multiple symbols included in the control message. The multiple symbols are allocated to a first layer signal constellation and to a second layer signal constellation, wherein the first layer signal constellation refers to base layer signals and the second signal constellation refers to enhancement layer signals. The multiple symbols of the first layer signal constellation and the second layer signal constellation are modulated based on said configuration information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 29 illustrates an exemplary message including one or more exemplary parameters sent to an access terminal to provide the mapping between logical channels and BPCs, in accordance with one embodiment.

Where possible, the same reference numbers are used throughout the drawings to refer to the same or like parts.

DETAILED DESCRIPTION OF EXAMPLE EMBODIMENTS

An orthogonal frequency division multiplexing (OFDM) is a digital multi-carrier modulation scheme, which uses a large number of closely-spaced orthogonal sub-carriers. Each sub-carrier is usually modulated with a modulation scheme (e.g., quadrature phase shift keying (QPSK)) at a low symbol rate while maintaining data rates similar to conventional single-carrier modulation schemes in the same bandwidth.

The OFDM originally does not have frequency diversity effect, but it can obtain frequency diversity effect by use of forward error correction (FEC) even in a distributed mode. That is, the frequency diversity effect becomes low when the channel coding rate is high.

In view of this, multi-carrier code division multiplexing (MC-CDM) or a multi-carrier code division multiple access (MC-CDMA) with advanced receivers can be used to compensate for low frequency diversity effect due to high channel coding rate.

The MC-CDM or MC-CDMA is a multiple access scheme used in OFDM-based system, allowing the system to support multiple users at the same time. In other words, the data can be spread over a much wider bandwidth than the data rate, a signal-to-noise and interference ratio can be minimized.

For example, with respect to signal processing, a channel response for each OFDM tone (or signal or sub-carrier) can be modeled as identical independent complex Gaussian variable. By doing so and using MC-CDM, diversity gain and processing gain can be attained. Here, interference, such as inter-symbol interference (ISI) or multiples access interference (MAI), is temporarily omitted in part due to the cyclic prefix or zero padding employed by OFDM or MC-CDM.

Figure 1:
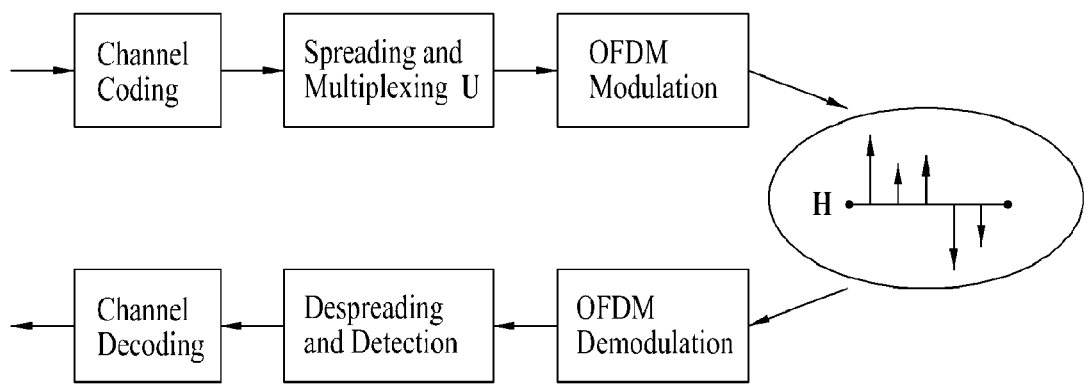
FIG. 1 is an exemplary diagram of a generalized MC-CDM structure, in accordance with one embodiment.

FIG. 1 is an exemplary diagram of a generalized MC-CDM structure. Referring to FIG. 1, $$\tilde{H} = \begin{bmatrix} \tilde{h}_1 & \\ & \tilde{h}_2 \end{bmatrix}$$

denotes the frequency response of fading channel, where $\tilde{h}_1$ is a complex Gaussian variable for the frequency-domain channel response of each sub-carrier. Furthermore, without loss of the generality, $$U_2 = \begin{bmatrix} \alpha & \beta \\ -\beta^* & \alpha^* \end{bmatrix}$$

denote the unitary symbol precoding matrix with power constraint $|\alpha|^2 + |\beta|^2 = 1$. It can be taken a generalization of the classic MC-CDM.

The processes of FIG. 1 include channel coding followed by spreading and multiplexing (which can be represented by U). Thereafter, the multiplexed data is modulated by using the OFDM modulation scheme.

At the receiving end, the OFDM modulated symbols are demodulated using OFDM demodulation scheme. They are then despread and detected, followed by channel decoding.

Further to the generalized MC-CDM structure, other structures are available such as rotated MC-CDM, OFDM, rotational OFDM (R-OFDM), or Walsh-Hadamard MC-CDM.

With respect to rotated MC-CDM, if $\alpha = \cos(\theta_1)$ and $\beta = \sin(\theta_1)$ then a real-value rotation matrix can be available as follows in Equation 1.

$$R_2(\theta_1) = \begin{bmatrix} \cos(\theta_1) & \sin(\theta_1) \\ -\sin(\theta_1) & \cos(\theta_1) \end{bmatrix} \quad \text{[Equation 1]}$$

$$R_2^{-1}(\theta_1) = R_2^H(\theta_1) = \begin{bmatrix} \cos(\theta_1) & -\sin(\theta_1) \\ \sin(\theta_1) & \cos(\theta_1) \end{bmatrix}$$

Furthermore, with respect to OFDM, if $\alpha\beta = 0$ or $\alpha\beta^* = 0$ then $U_2$ becomes $I_2$. In other words, $U_2$ becomes uncoded OFDM or uncoded OFDMA. In addition, with respect to Walsh-Hadamard MC-CDM, if $$\alpha = \cos\left(\frac{\pi}{4}\right) = \frac{\sqrt{2}}{2} \text{ and } \beta = \sin\left(\frac{\pi}{4}\right) = \frac{\sqrt{2}}{2},$$

$U_2 = R_2$ become a classic Walsh-Hadamard matrix.

Figure 2:
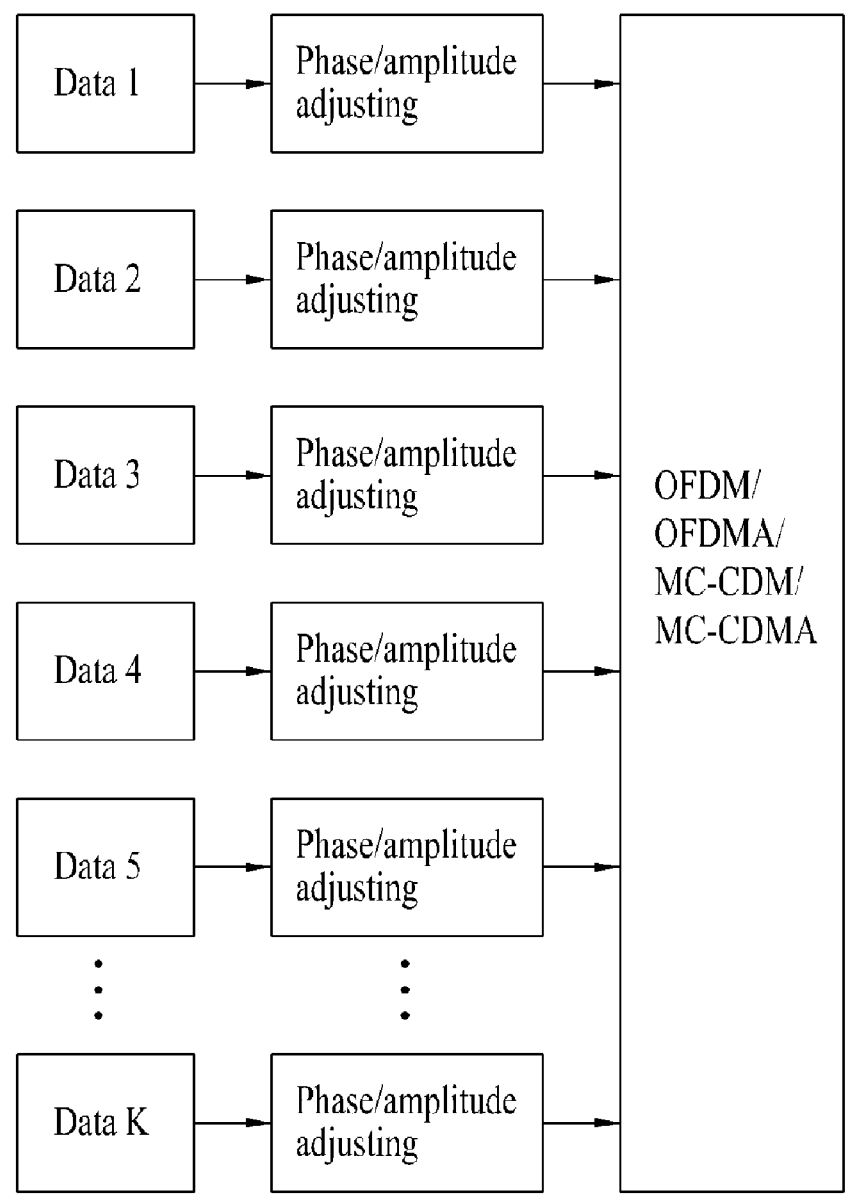
FIG. 2 is another exemplary diagram of a generalized MC-CDM structure in accordance with one embodiment.

FIG. 2 is another exemplary diagram of a generalized MC-CDM structure. In FIG. 2, a plurality of data are inputted which are then precoded and/or rotated. Here, the precoding or rotation also can signify adjustment of the amplitude and/or phase of incoming data.

With respect to precoding/rotation, different tones or sub-carriers may be precoded/rotated independently or jointly. Here, the joint precoding/rotation of the incoming data or data streams can be performed by using a single rotation matrix. Alternatively, different incoming data or data streams can be separated into multiple groups, where each group of data streams can be precoded/rotated independently or jointly.

Figure 3:
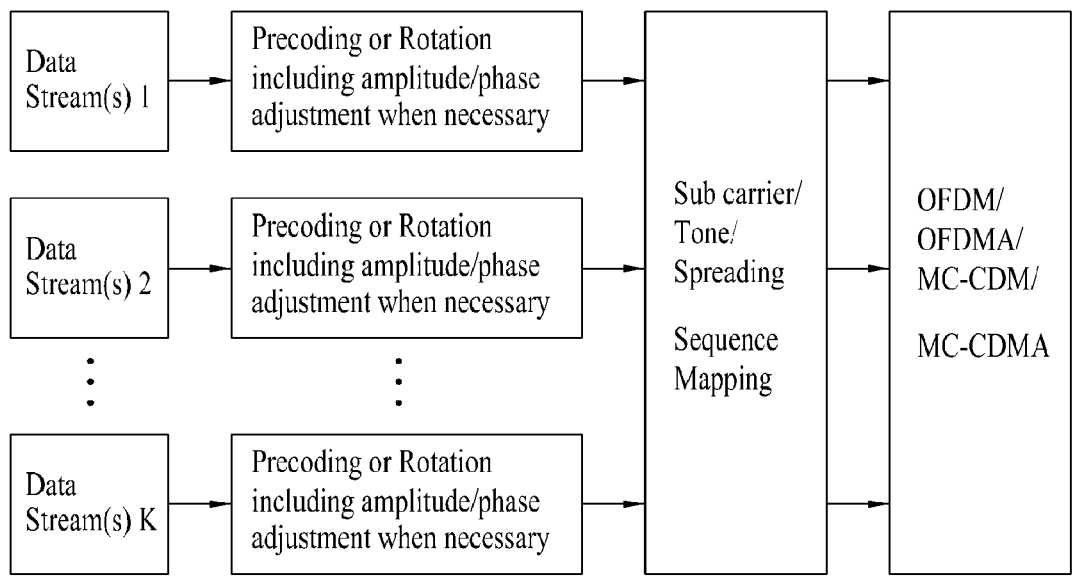
FIG. 3 is an exemplary diagram illustrating a generalized MC-CDM structure in which precoding/rotation is performed on groups in accordance with one embodiment.

FIG. 3 is an exemplary diagram illustrating a generalized MC-CDM structure in which precoding/rotation is performed on groups. Referring to FIG. 3, multiple data or data streams are grouped into Data Stream(s) 1, 2 ..., K groups which are then precoded/rotated per group. Here, the precoding/rotation can include amplitude and/or phase adjustment, if necessary. Thereafter, the precoded/rotated symbols are mapped.

Further, different rotation/precoding on different groups may lead to a mixture of OFDM, MC-CDM or R-OFDM. In addition, the rotation/precoding of each group may be based on the QoS requirement, the receiver profile, and/or the channel condition.

Alternatively, instead of using a big precoding/rotation matrix, a smaller-sized precoding/rotation matrix can be dependently or independently applied to different groups of incoming data streams.

Figure 4:
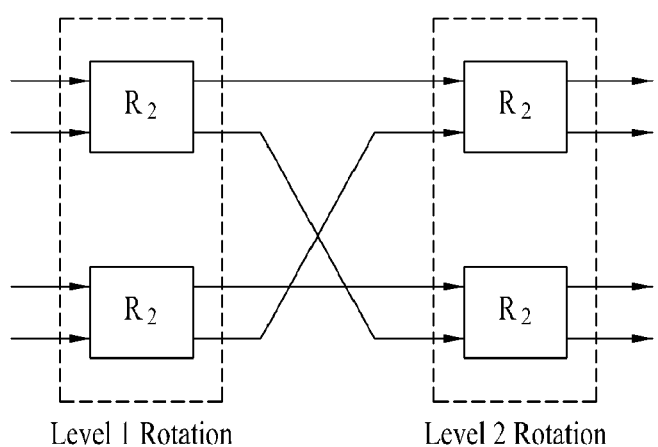
FIG. 4 is an exemplary diagram illustrating a multi-stage rotation in accordance with one embodiment.

In operation, actual precoding/rotation operation can be performed in multiple stages. FIG. 4 is an exemplary diagram illustrating a multi-stage rotation. Referring to FIG. 4, multiple data or data streams are inputted which are then precoded/rotated. Here, these processed symbols can be grouped into at least two groups. Each group is represented by at least one symbol.

With respect to rotation of the symbols, the symbol(s) of each group can be spread using a spreading matrix. Here, the spreading matrix that is applied to a group may be different and can be configured. After the symbols are processed through the spreading matrix, then the output(s) can be re-grouped into at least two groups. Here, the re-grouped outputs comprise at least one selected output from each of the at least two groups.

Thereafter, these re-grouped outputs can be spread again using the spreading matrix. Again, the spreading matrix that is applied to a group may be different and can be configured. After the outputs are processed through another spreading matrix, they are inputted to an inverse fast Fourier transform (IFFT).

Figure 5:
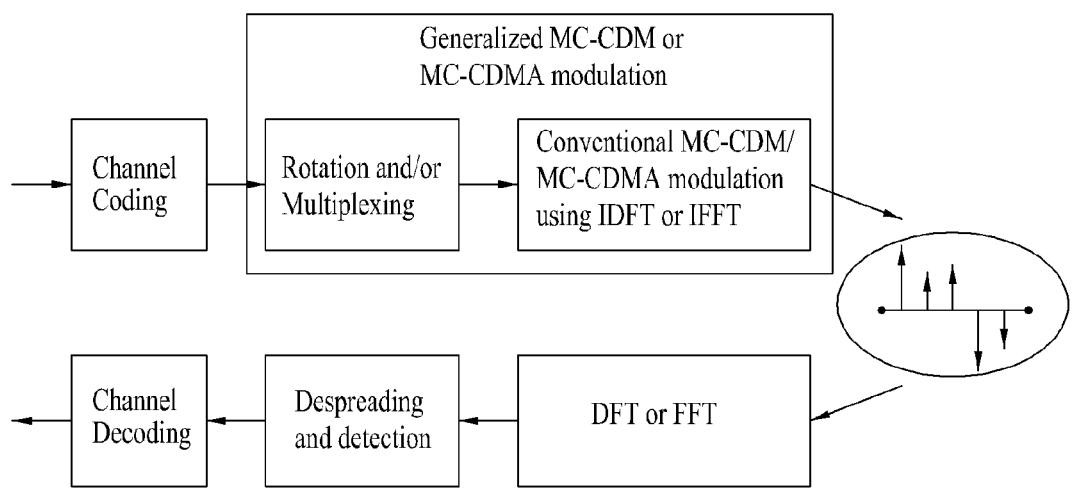
FIG. 5 is another exemplary diagram of a generalized MC-CDM structure in accordance with one embodiment.

A rotation scheme such as the multi-stage rotation can also be employed by a generalized MC-CDM or multi-carrier code division multiple access (MC-CDMA). FIG. 5 is an exemplary diagram illustrating a general block of the MC-CDM.

FIG. 5 is another exemplary diagram of a generalized MC-CDM structure. More specifically, the processes as described with respect to FIG. 5 are similar to those of FIG. 1 except that FIG. 5 is based on generalized MC-CDM or MC-CDMA that uses rotation (e.g., multi-stage rotation). Here, after channel coding, the coded data are rotated and/or multiplexed, followed by modulation using inverse discrete Fourier transform (IDFT) or IFFT.

At the receiving end, the modulated symbols are demodulated using discrete Fourier transform (DFT) or fast Fourier transform (FFT). They are then despread and detected, followed by channel decoding.

In addition, interlacing is available in the generalized MC-CDM. In 1× evolution data optimized (1×EV-DO) BCMCS and enhanced BCMCS (EBCMCS), the multipath delay spread is about $T_d = 3.7 \mu s$ and the coherent bandwidth is around $$B_c = \frac{1}{T_d} = 270 \text{ kHz}.$$

Therefore, the maximum frequency diversity order is $$d = \frac{B}{B_c} = \frac{1.25}{0.27} \approx 5.$$

This means, in order to capture the maximum frequency diversity here, the MC-CDM spreading gain $L \geq 5$ is possibly enough.

Figure 6:
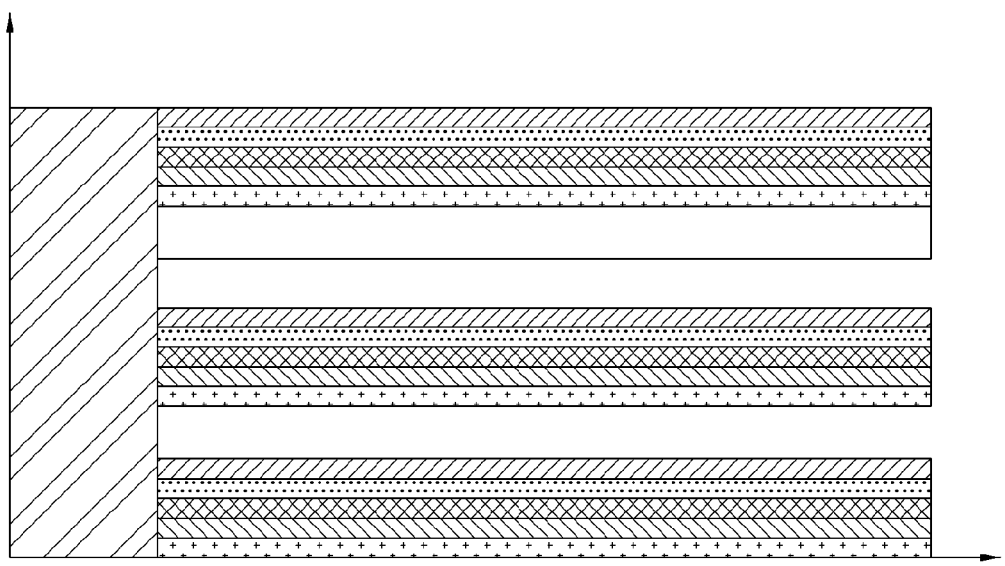
FIG. 6 is an exemplary diagram illustrating frequency-domain interlaced MC-CDM in accordance with one embodiment.

Based on the above analysis, a frequency-domain interlaced MC-CDM can be used. FIG. 6 is an exemplary diagram illustrating frequency-domain interlaced MC-CDM. Referring to FIG. 6, each slot, indicated by different fills, can be one tone (or sub-carrier) or multiple consecutive tones (or sub-carriers).

The tone(s) or sub-carrier(s) or symbol(s) can be rotated differently. In other words, the product distance, which can be defined as the product of Euclidean distances, can be maximized. In detail, a minimum product distance, which is used for optimizing modulation diversity, can be shown by the following equation. The minimum product distance can also be referred to as Euclidean distance minimization.

$$D_p = \min \prod_{i \neq j, s_i \in A} |s_i - s_j| \quad \text{[Equation 3]}$$

Referring to Equation 3, $s_i \in A$ denotes the transmitted symbols. Furthermore, optimization with maximizing the minimum production distance can be done by solving the following equation.

$$U_2(e^{j\phi}) = \underset{U}{\arg\max} D_p = \underset{U}{\arg\max} \min \prod_{i \neq j, s_i \in A} |Us_i - Us_j| \quad \text{[Equation 4]}$$

Referring to Equation 4, $$U_2(e^{j\phi}) = \begin{bmatrix} \alpha & \alpha e^{j\phi} \\ -\alpha^* e^{-j\phi} & \alpha^* \end{bmatrix}.$$

For example, for the traditional quadrature phase shift keying (QPSK), $U_2(e^{j\Phi})$ can be decided by calculating $$d(e^{j\phi}) = \frac{1}{2}|\Delta_1^2 - (e^{j\phi}\Delta_2)^2|$$

where $\Delta_{1,2} \in \{\pm 1, \pm j, \pm 1 \pm j\}$.

As discussed, each tone or symbol can be rotated differently. For example, a first symbol can be applied QPSK, a second symbol can be applied a binary phase shift keying (BPSK), and nth symbol can be applied 16 quadrature amplitude modulation (16QAM). To put differently, each tone or symbol has different modulation angle.

In rotation OFDM/MC-CDM (R-OFDM/MC-CDM), $$\hat{H} = \tilde{H}U_2 = \begin{bmatrix} \tilde{h}_1 & \\ & \tilde{h}_2 \end{bmatrix}\begin{bmatrix} \alpha & \beta \\ -\beta^* & \alpha^* \end{bmatrix} = \begin{bmatrix} \tilde{h}_1\alpha & \tilde{h}_1\beta \\ -\tilde{h}_2\beta^* & \tilde{h}_2\alpha^* \end{bmatrix}.$$

For rotated MC-CDM, the combined frequency-domain channel response matrix can be as shown in Equation 5.

$$\hat{H}(\theta_1) = \tilde{H}R_2(\theta_1) = \begin{bmatrix} \tilde{h}_1 & \\ & \tilde{h}_2 \end{bmatrix} \quad \text{[Equation 5]}$$

$$\begin{bmatrix} \cos(\theta_1) & \sin(\theta_1) \\ -\sin(\theta_1) & \cos(\theta_1) \end{bmatrix} = \begin{bmatrix} \tilde{h}_1\cos(\theta_1) & \tilde{h}_1\sin(\theta_1) \\ -\tilde{h}_2\sin(\theta_1) & \tilde{h}_2\cos(\theta_1) \end{bmatrix}$$

The effect of the transform can be illustrated in a correlation matrix of Equation 6.

$$C = \hat{H}^{-H}H \quad \text{[Equation 6]}$$

$$= \begin{bmatrix} \tilde{h}_1^*\alpha^* & -\tilde{h}_2^*\beta \\ \tilde{h}_1^*\beta^* & \tilde{h}_2^*\alpha^* \end{bmatrix}\begin{bmatrix} \tilde{h}_1\alpha & \tilde{h}_1\beta \\ -\tilde{h}_2\beta^* & \tilde{h}_2\alpha^* \end{bmatrix}$$

$$= \begin{bmatrix} |\tilde{h}_1|^2|\alpha|^2 + |\tilde{h}_2|^2|\beta|^2 & (|\tilde{h}_1|^2 - |\tilde{h}_2|^2)\alpha^*\beta \\ (-|\tilde{h}_1|^2 - |\tilde{h}_2|^2)\alpha\beta^* & |\tilde{h}_2|^2|\alpha|^2 + |\tilde{h}_1|^2|\beta|^2 \end{bmatrix}$$

$$= D + I$$

$$= \begin{bmatrix} |\tilde{h}_1|^2|\alpha|^2 + |\tilde{h}_2|^2|\beta|^2 & 0 \\ 0 & |\tilde{h}_2|^2|\alpha|^2 + |\tilde{h}_1|^2|\beta|^2 \end{bmatrix} +$$

$$\begin{bmatrix} 0 & (|\tilde{h}_1|^2 - |\tilde{h}_2|^2)\alpha^*\beta \\ (-|\tilde{h}_1|^2 - |\tilde{h}_2|^2)\alpha\beta^* & 0 \end{bmatrix}$$

Referring to Equation 3, the diversity can be denoted by $$D = \begin{bmatrix} |\tilde{h}_1|^2|\alpha|^2 + |\tilde{h}_2|^2|\beta|^2 & 0 \\ 0 & |\tilde{h}_2|^2|\alpha|^2 + |\tilde{h}_1|^2|\beta|^2 \end{bmatrix},$$

and the interference matrix can be denoted by $$I = \begin{bmatrix} 0 & (|\tilde{h}_1|^2 - |\tilde{h}_2|^2)\alpha^*\beta \\ (-|\tilde{h}_1|^2 + |\tilde{h}_2|^2)\alpha\beta^* & 0 \end{bmatrix}.$$

Here, the interference matrix can be ISI or multiple access interference (MAI).

A total diversity of the generalized MC-CDM can be represented as shown in Equation 7.

$$D = \quad \text{[Equation 7]}$$

$$Tr\{D\} = Tr\left\{\begin{bmatrix} |\tilde{h}_1|^2|\alpha|^2 + |\tilde{h}_2|^2|\beta|^2 & 0 \\ 0 & |\tilde{h}_2|^2|\alpha|^2 + |\tilde{h}_1|^2|\beta|^2 \end{bmatrix}\right\} =$$

$$|\tilde{h}_1|^2 + |\tilde{h}_2|^2$$

Referring to Equation 4, the total diversity of the generalized MC-CDM is independent on the preceding matrix U. However, for each symbol or user, the diversity gain may be different to each.

Further, the interference of the generalized MC-CDM can be represented as shown in Equation 8.

$$I = Tr_2\{I\} = Tr_2\left\{\begin{bmatrix} 0 & (|\tilde{h}_1|^2 - |\tilde{h}_2|^2)\alpha^*\beta \\ (-|\tilde{h}_1|^2 + |\tilde{h}_2|^2)\alpha\beta^* & 0 \end{bmatrix}\right\} = \quad \text{[Equation 8]}$$

$$2||\tilde{h}_1|^2 - |\tilde{h}_2|^2||\alpha\beta^*| \leq ||\tilde{h}_1|^2 - |\tilde{h}_2|^2|$$

Here, if $|\tilde{h}_1|^2 \neq |\tilde{h}_2|^2$ and $|\alpha\beta^*| \neq 0$, there is some self-interference or multi-user interference. In other words, due to frequency-selectivity in OFDM-liked orthogonal modulation, there is possible interference if some preceding or spreading is applied. Furthermore, it can be shown that this interference can be maximized when the rotation angel is $$\theta = \frac{\pi}{4}.$$

In designing a MC-CDM transceiver, inter alia, an inter-symbol or multiple access signal-to-interference ratio (SIR) can be defined as follows.

$$SIR_1 = \frac{|\tilde{h}_1|^2|\alpha|^2 + |\tilde{h}_2|^2|\beta|^2}{||\tilde{h}_1|^2 - |\tilde{h}_2|^2||\alpha\beta^*|} = \frac{|\alpha|^2 + \gamma|\beta|^2}{|1-\gamma||\alpha\beta^*|} \quad \text{[Equation 9]}$$

Referring to Equation 9, $$\gamma = \frac{|\tilde{h}_2|^2}{|\tilde{h}_1|^2}$$

denotes the channel fading difference. The SIR can be defined based on channel fading and rotation.

Rotation can also be performed based on receiver profile. This can be done through upper layer signaling. More specifically, at least two parameters can be configured, namely, spreading gain and rotation angle.

In operation, a receiver can send feedback information containing its optimum rotation angle and/or rotation index. The rotation angle and/or rotation index can be mapped to the proper rotation angle by a transmitter based on a table (or index). This table or index is known by both the transmitter and the receiver. This can be done any time when it is the best time for the transmitter and/or receiver.

For example, if the receiver (or access terminal) is registered with the network, it usually sends its profile to the network. This profile includes, inter alia, the rotation angle and/or index.

Before the transmitter decides to send signals to the receiver, it may ask the receiver as to the best rotation angle. In response, the receiver can send the best rotation angle to the transmitter. Thereafter, the transmitter can send the signals based on the feedback information and its own decision.

During transmission of the signals, the transmitter can periodically request from the receiver to send its updated rotation angle. Alternatively, the transmitter can request an update of the rotation angle from the receiver after the transmitter is finished transmitting.

At any time, the receiver can send the update (or updated rotation angle) to the transmitter. The transmission of the update (or feedback information) can be executed through an access channel, traffic channel, control channel, or other possible channels.

With respect to channel coding, coding can help minimize demodulation errors and therefore achieve the throughput in addition to signal design for higher spectral efficiency. In reality, most capacity-achieving codes are designed to balance the implementation complexity and achievable performance.

Figure 7:
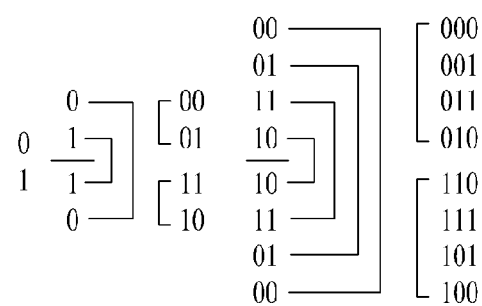
FIG. 7 is an exemplary diagram illustrating an example of Gray coding in accordance with one embodiment.

Gray code is one of an example of channel coding which is also known as reflective binary code. Gray code or the reflective binary code is a binary numeral system where two successive values differ in only one digit. FIG. 7 is an exemplary diagram illustrating an example of Gray coding.

Gray code for bits-to-symbol mapping, also called Gray mapping, can be implemented with other channel coding scheme. Gray mapping is generally accepted as the optimal mapping rule for minimizing bit error rate (BER). Gray mapping for regular QPSK/QPSK hierarchical modulation (or 16QAM modulation) is shown in FIG. 8 where the codewords with minimum Euclid distance have minimum Hamming distance as well.

In the figures to follow, the Gray mapping rule is described. More specifically, each enhancement layer bits-to-symbol and base layer bits-to-symbol satisfy the Gray mapping requirement where the closest two symbols only have difference of one or the least bit(s). Furthermore, the overall bits-to-symbol mapping rule satisfies the Gray mapping rule.

Figure 8:
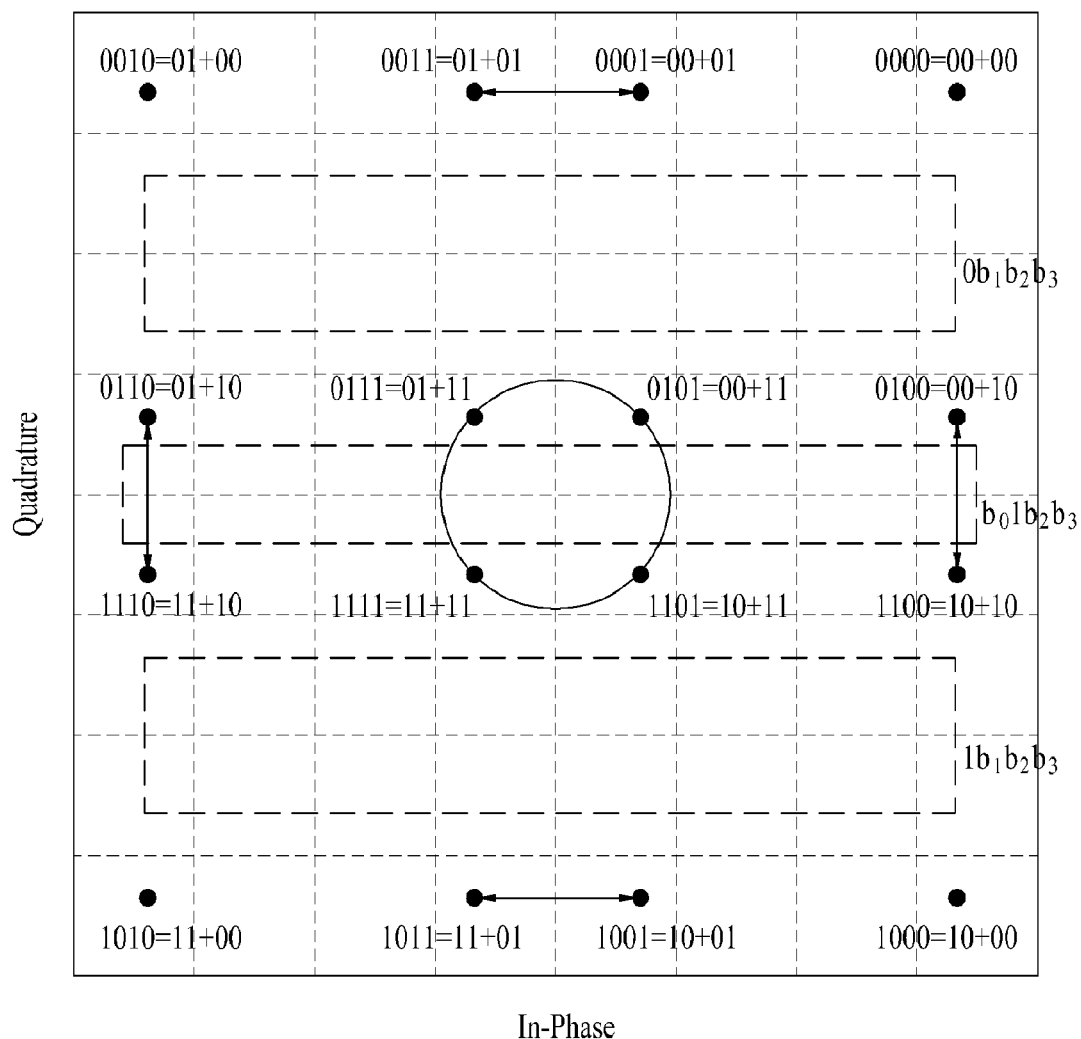
FIG. 8 is an exemplary diagram illustrating mapping for regular QPSK/QPSK hierarchical modulation or 16QAM modulation in accordance with one embodiment.

FIG. 8 is an exemplary diagram illustrating mapping for regular QPSK/QPSK hierarchical modulation or 16QAM modulation. Referring to FIG. 8, the enhancement layer bits and the base layer bits can be arbitrarily combined so that every time when the base layer bits are detected, the enhancement layer bits-to-symbol mapping table/rule can be decided, for example. In addition, both the base layer and the enhancement layer are QPSK. Furthermore, every point (or symbol) is represented and/or mapped by b0b1b2b3.

More specifically, the circle in the center of the diagram and the lines connecting two (2) points (or symbols) (e.g., point 0011 and point 0001 or point 0110 and point 1110) represent connection with only one bit difference between neighbors. Here, the connected points are from different layers. In other words, every connected points (or symbol) belong to either base layer bits or enhancement layer bits.

Furthermore, every point can be represented by four (4) bits (e.g., b0b1b2b3) in which the first bit (b0) and the third bit (b2) represent the base layer bits, and the second bit (b1) and the fourth bit (b3) represent the enhancement bits. That is, two (2) bits from the base layer and the two (2) bits from the enhancement layer are interleaved together to represent every resulted point. By interleaving the bits instead of simple concatenation of the bits from two layers, additional diversity gain can be potentially attained.

Figure 9:
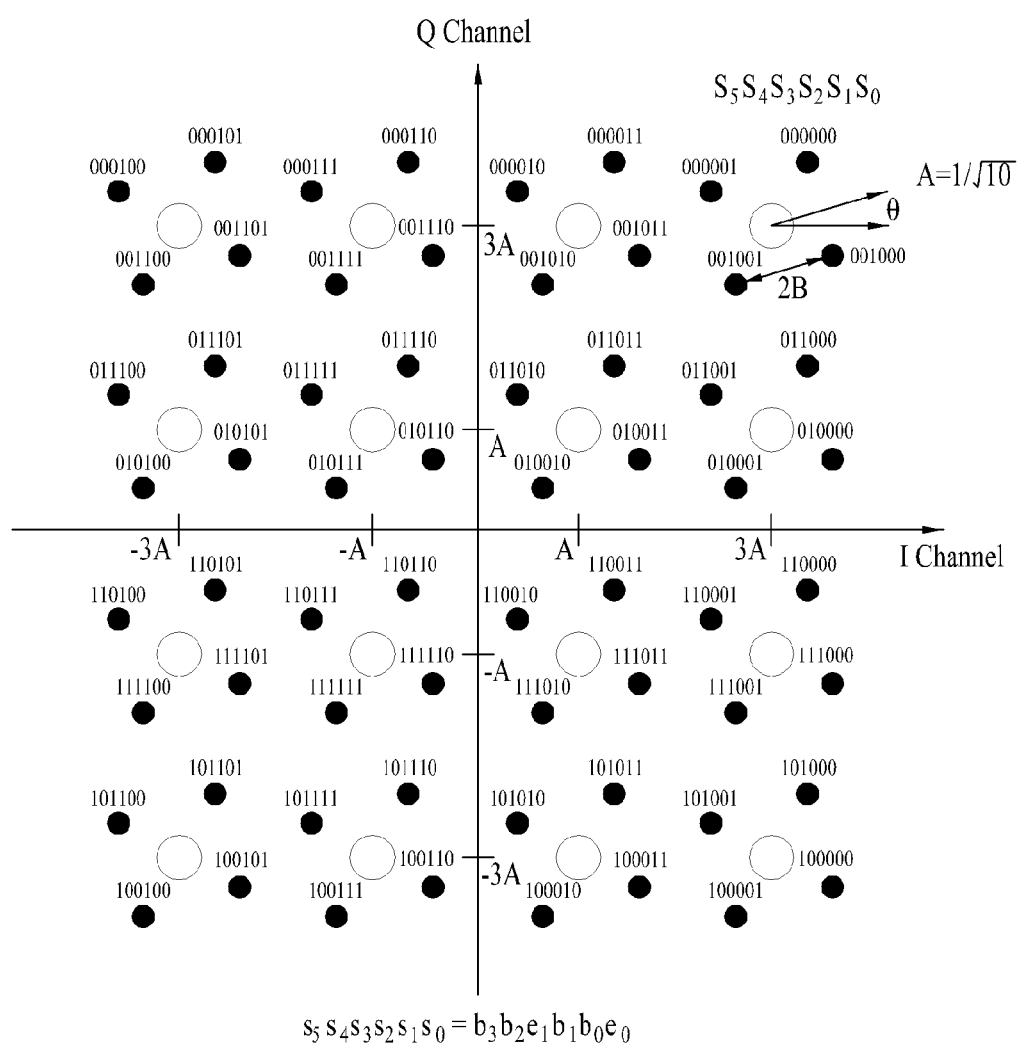
FIG. 9 is an exemplary diagram illustrating bits-to-symbol mapping for 16QAM/QPSK in accordance with one embodiment.

FIG. 9 is an exemplary diagram illustrating bits-to-symbol mapping for 16QAM/QPSK. This figure refers to bits-to-symbol mapping. This mapping can be used by both the transmitter and the receiver.

If a transmitter desires to send bits b0b1b2b3b4b5, the transmitter needs to look for a mapped symbol to send. Hence, if a receiver desires to demodulate a received symbol, the receiver can use this figure to find/locate the demodulated bits.

Furthermore, FIG. 9 represents 16QAM/QPSK hierarchical modulation. In other words, the base layer is modulated by 16QAM, and the enhancement layer is modulated by QPSK. Moreover, 16QAM/QPSK can be referred to as a special hierarchical modulation. In other words, the base layer signal and the enhancement signal have different initial phase. For example, the base layer signal phase is 0 while the enhancement layer signal phase is theta ($\theta$).

Every symbol in FIG. 9 is represented by bits sequence, s5s4s3s2s1s0, in which bits s3 and s0 are bits from the enhancement layer while the other bits (e.g., s5, s4, s2, and s1) belong to the base layer.

Figure 10:
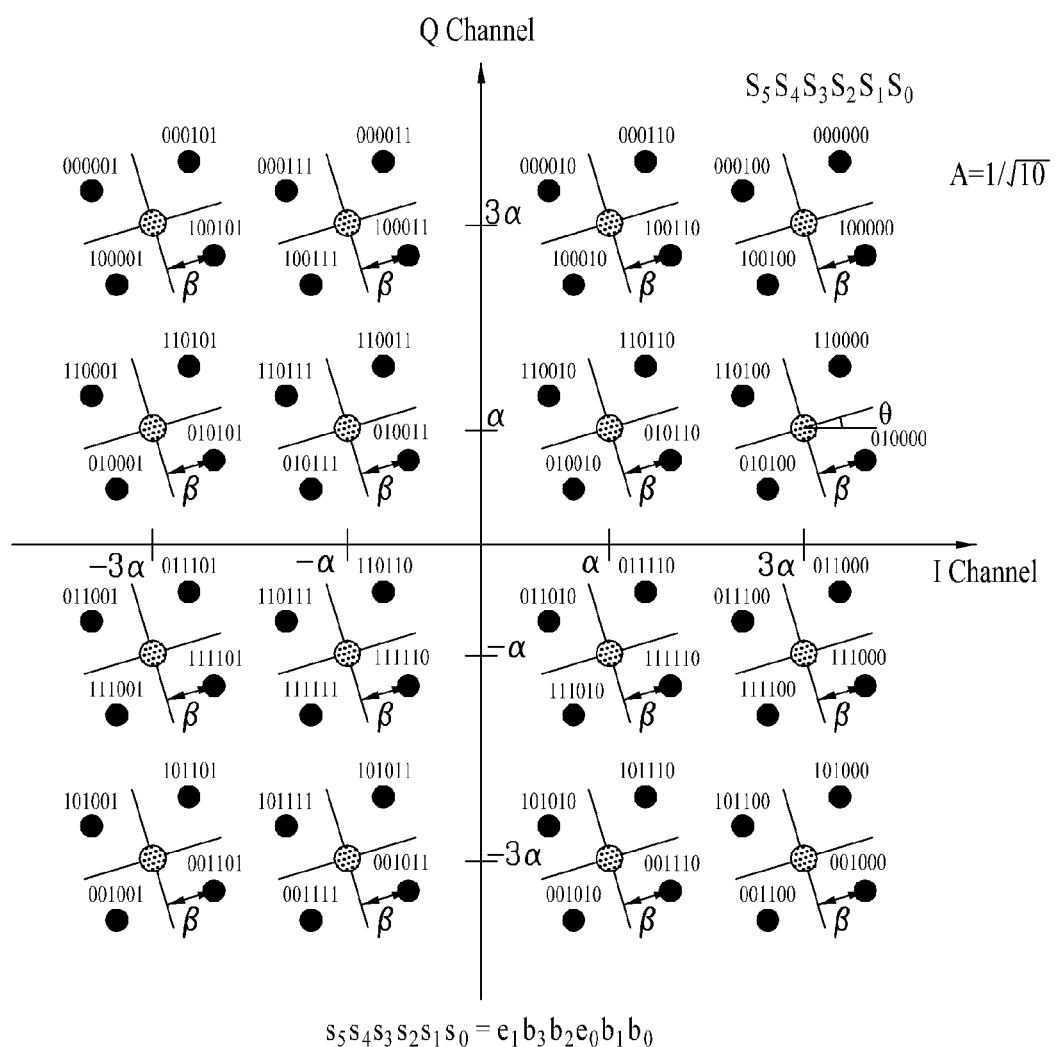
FIG. 10 is another exemplary diagram illustrating bits-to-symbol mapping for 16QAM/QPSK in accordance with one embodiment.

FIG. 10 is another exemplary diagram illustrating bits-to-symbol mapping for 16QAM/QPSK. The difference between FIG. 10 and previous FIG. 9 is that every symbol in FIG. 10 is represented by bits sequence, s5s4s3s2s1s0, in which bits s5 and s2 are bits from the enhancement layer while the other bits (e.g., s4, s3, s1, and s0) are from the base layer.

Figure 11:
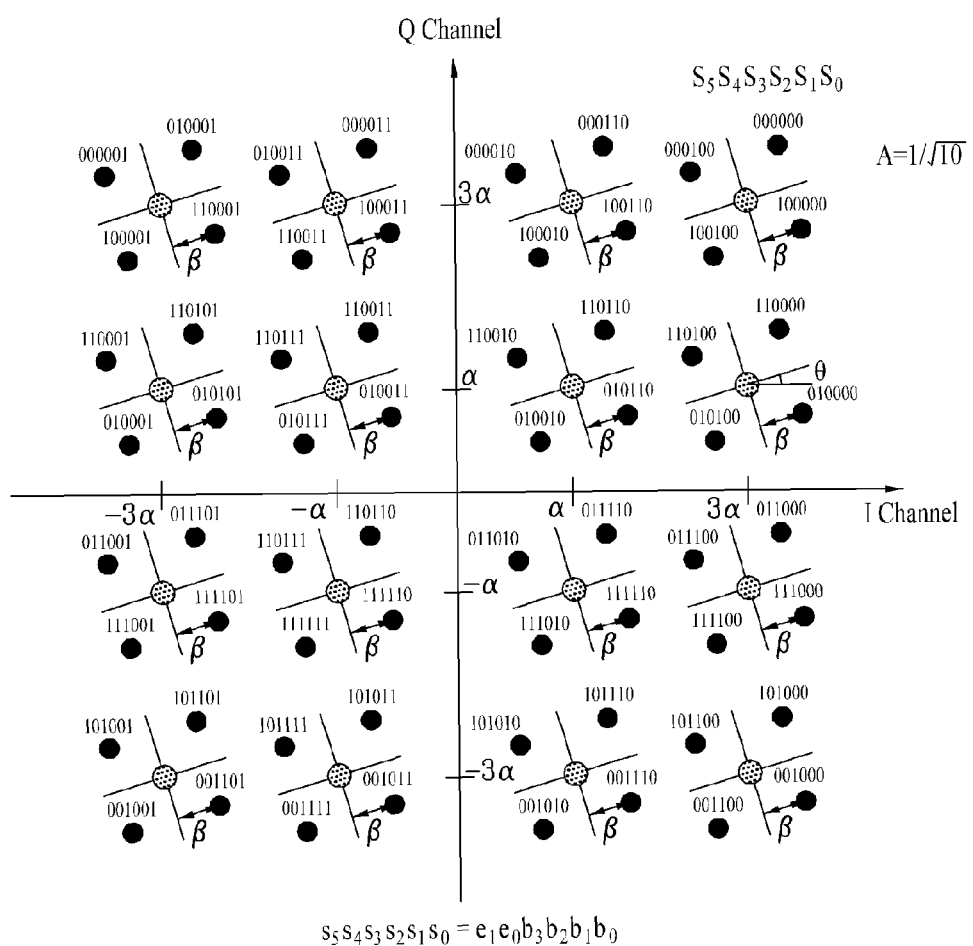
FIG. 11 is another exemplary diagram illustrating bits-to-symbol mapping for 16QAM/QPSK in accordance with one embodiment.

FIG. 11 is another exemplary diagram illustrating bits-to-symbol mapping for 16QAM/QPSK. The difference between FIG. 11 and previous FIG. 9 and/or 10 is that every symbol in FIG. 11 is represented by bits sequence, s5s4s3s2s1s0, in which bits s5 and s4 are bits from the enhancement layer while the other bits (e.g., s3, s2, s1, and s0) are from the base layer.

Figure 12:
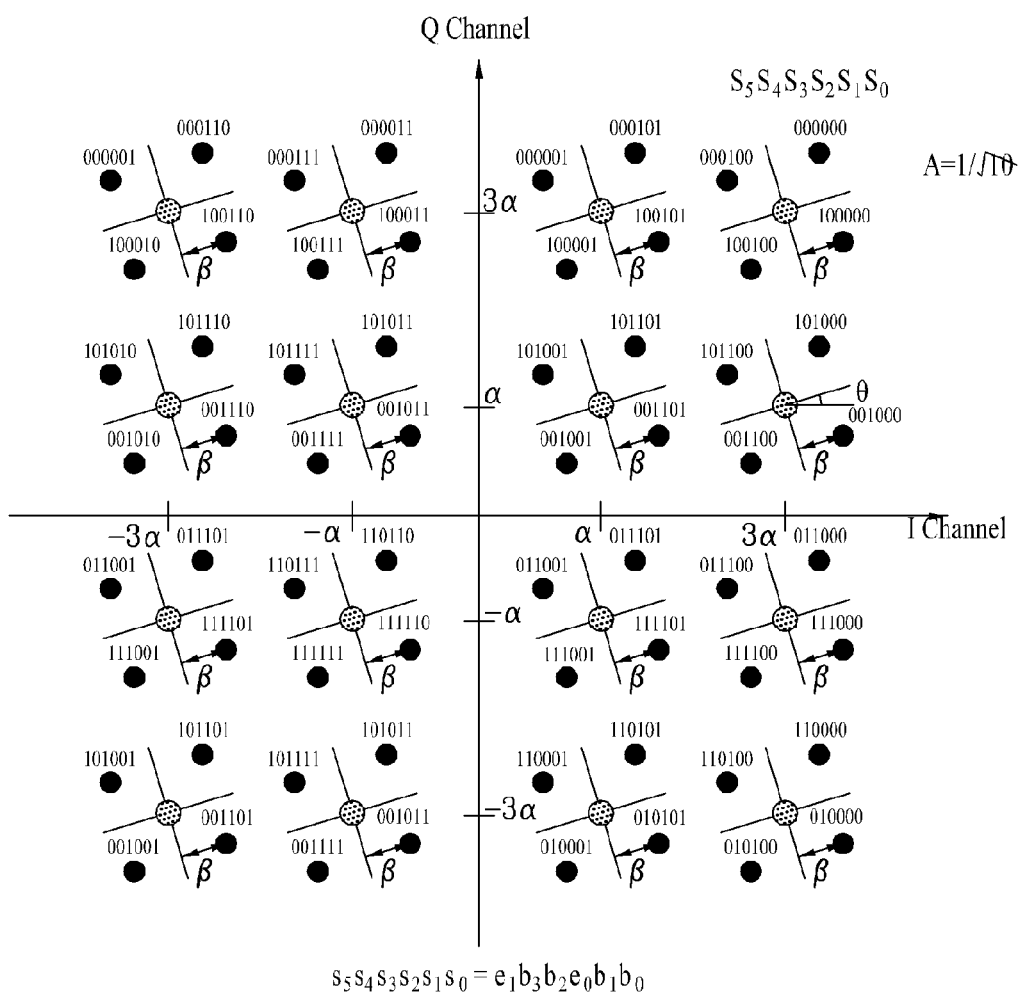
FIG. 12 is another exemplary diagram illustrating bits-to-symbol mapping for 16QAM/QPSK in accordance with one embodiment.

FIG. 12 is another exemplary diagram illustrating bits-to-symbol mapping for 16QAM/QPSK. The difference between FIG. 12 and previous FIGS. 9, 10, and/or 11 bits s5 and s2 are bits from the enhancement layer while the other bits (e.g., s4, s3, s1, and s0) are from the base layer. As before, every symbol in FIG. 12 is represented by bits sequence, s5s4s3s2s1s0.

Further to bits sequence combinations as discussed above, the following hierarchical layer and enhancement layer combination possibilities include (1)

s5s4s3s2s1s0=b3b2b1e1b0e0, (2)
s5s4s3s2s1s0=b3e1b2b1b0e0, (3)
s5s4s3s2s1s0=b3b2b1b0e0e1, (4)
s5s4s3s2s1s0=e0e1b3b2b1b0, (5)
s5s4s3s2s1s0=e0b3b2e1b1b0, (6)
s5s4s3s2s1s0=b3b2e0b1b0e1, (7) s3s2s1s0=e1b1e0b0, (8) s3s2s1s0=e0b1e1b0, (9) s3s2s1s0=e1e0b1b0, (10) s3s2s1s0=e0e1b1b0, and (11) s3s2s1s0=b1b0e0e1.

In addition to the combinations discussions of above, there are many other possible combinations. However, they all follow the same rule which is the Gray rule or the Gray mapping rule. As discussed, each enhancement layer bits-to-symbol mapping and base layer bits-to-symbol mapping satisfy the Gray mapping rule requirement which is that the closest two symbols only have difference of one bit or less. Moreover, the overall bits-to-symbol mapping rule satisfies the Gray mapping rule as well.

Further, the enhancement layer bits and the base layer bits can be arbitrarily combined so that every time the base layer bits are detected, the enhancement layer bits-to-symbol mapping table/rule can be decided. In addition, it is possible, for example, for s3s2s1s0=e1e0b1b0 QPSK/QPSK, the Gray mapping rule for enhancement layer s3s211=e1e011 to be not the exactly the same as s3s210=e1e010. Moreover, for example, it is possible s3s211=e1e011 is a rotated version as s3s210=e1e010, s3s211=1111's position is the position of s3s211=1010 or s3s211=0110.

Figure 13:
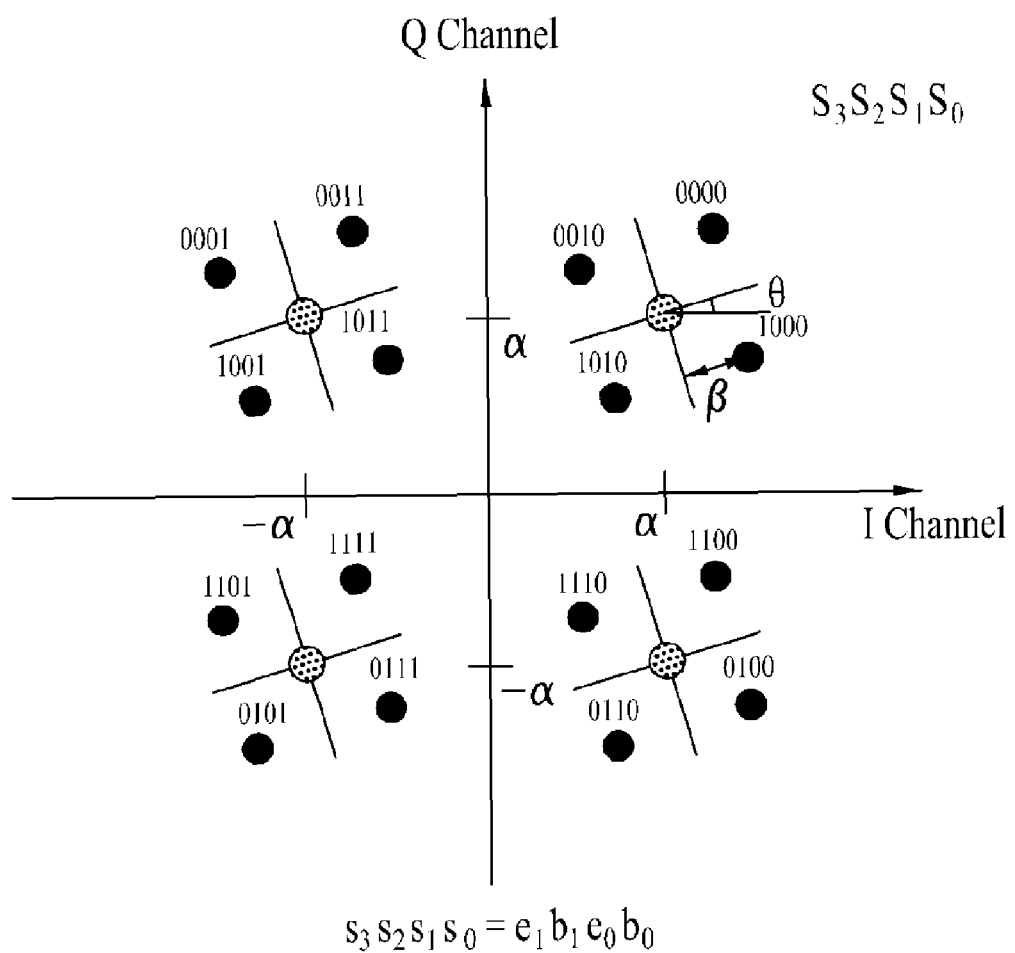
FIG. 13 is an exemplary diagram illustrating bits-to-symbol mapping for QPSK/QPSK in accordance with one embodiment.

FIG. 13 is an exemplary diagram illustrating bits-to-symbol mapping for QPSK/QPSK. Referring to FIG. 13, the bits-to-symbol mapping can be used by both the transmitter and the receiver. If a transmitter desires to send bits b0b1b2b3, the transmitter needs to look for a mapped symbol to send. Hence, if a receiver desires to demodulate the received symbol, the receiver can use this figure to find/locate the demodulated bits.

Furthermore, FIG. 13 represents QPSK/QPSK hierarchical modulation. In other words, the base layer is modulated by QPSK, and the enhancement layer is also modulated by QPSK. Moreover, QPSK/QPSK can be referred to as a special hierarchical modulation. That is, the base layer signal and the enhancement signal have different initial phase. For example, the base layer signal phase is 0 while the enhancement layer signal phase is theta ($\theta$).

Every symbol in FIG. 13 is represented by bits sequence, s3s2s1s0, in which bits s3 and s1 are bits from the enhancement layer while the other bits (e.g., s2 and s0) belong to the base layer.

Figure 14:
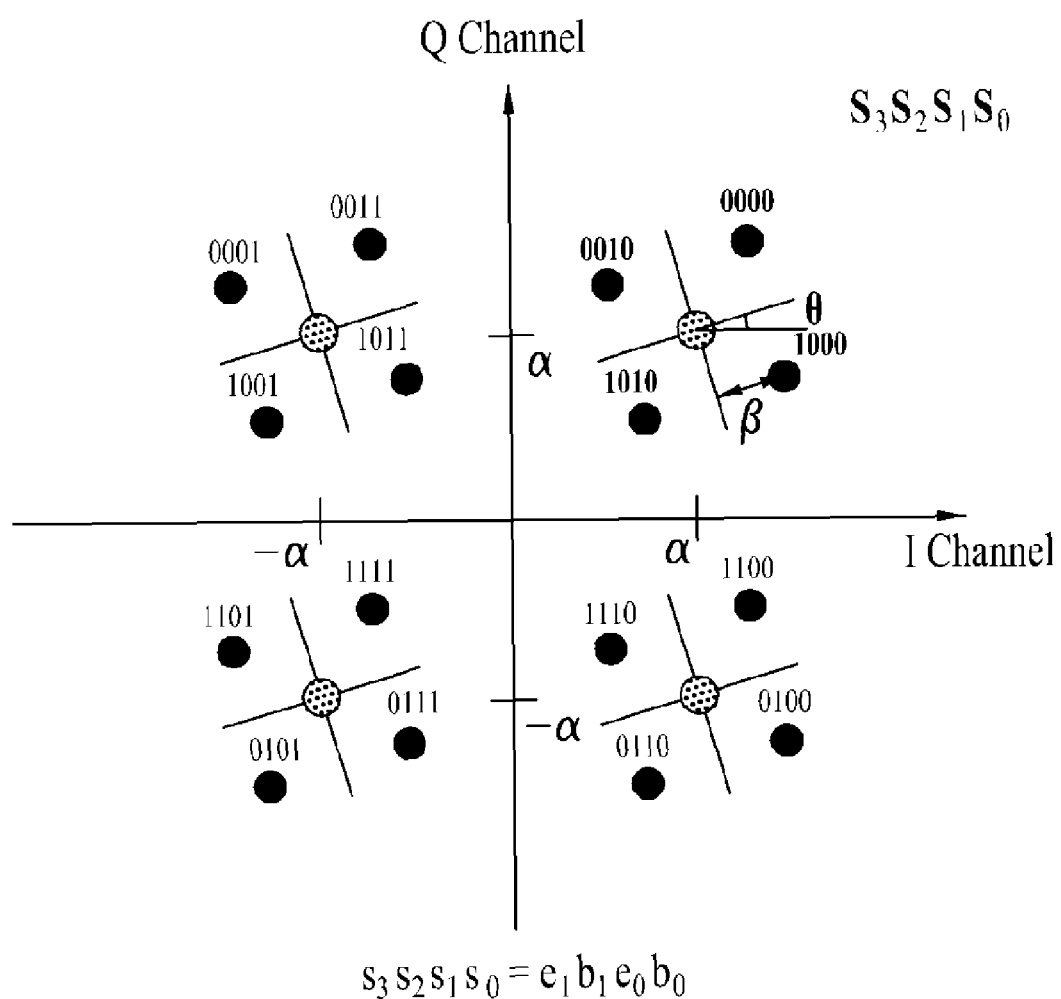
FIG. 14 is an exemplary diagram illustrating an enhancement layer bits-to-symbol for base layer 0x0 in accordance with one embodiment.

Further, in the QPSK/QPSK example, the enhancement layer bits-to-symbol mapping rules may be different from the base layer symbol-to-symbol. FIG. 14 is an exemplary diagram illustrating an enhancement layer bits-to-symbol for base layer 0×0. In other words, FIG. 14 illustrates an example of how the base layer bits are mapped.

For example, the symbols indicated in the upper right quadrant denote the base layer symbols of '00'. This means that as long as the base layer bits are '00', whatever the enhancement layer is, the corresponding layer modulated symbol is one of the four (4) symbols of this quadrant.

Figure 15:
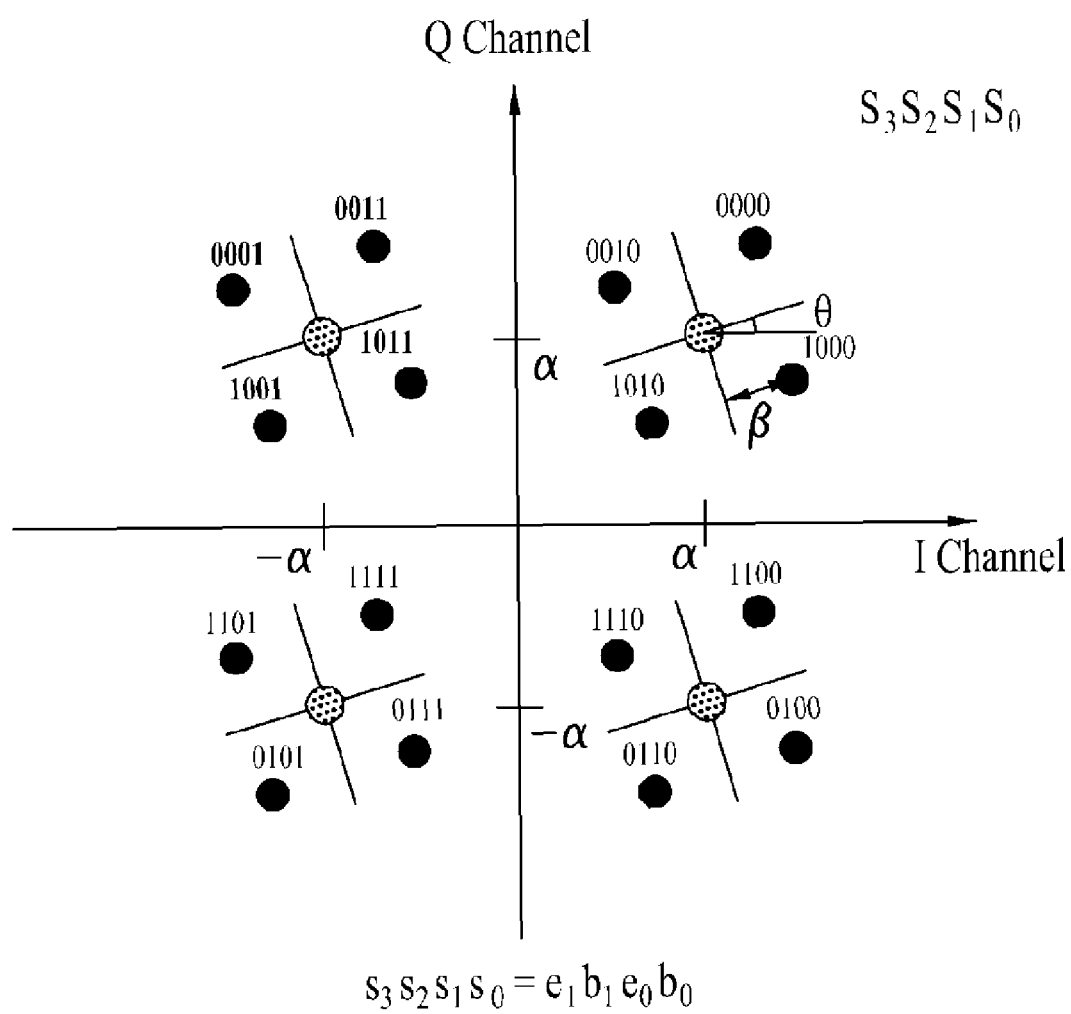
FIG. 15 is an exemplary diagram illustrating an enhancement layer bits-to-symbol for base layer 0x1 in accordance with one embodiment.

FIG. 15 is an exemplary diagram illustrating an enhancement layer bits-to-symbol for base layer 0×1. Similarly, this diagram illustrates another example of how the base layer bits are mapped. For example, the symbols of in the upper left quadrant denote the base layer symbols of '01'. This means that as long as the base layer bits are '01', whatever the enhancement layer bits are, the corresponding layer modulated symbols is one of the symbols of the upper left quadrant.

As discussed above with respect to FIGS. 1-3, the inputted data or data stream can be channel coded using the Gray mapping rule, for example, followed by other processes including modulation. The modulation discussed here refers to layered (or superposition) modulation. The layered modulation is a type of modulation in which each modulation symbol has bits corresponding to both a base layer and an enhancement layer. In the discussions to follow, the layered modulation will be described in the context of broadcast and multicast services (BCMCS).

In general, layered modulation can be a superposition of any two modulation schemes. In BCMCS, a QPSK enhancement layer is superposed on a base QPSK or 16-QAM layer to obtain the resultant signal constellation. The energy ratio r is the power ratio between the base layer and the enhancement. Furthermore, the enhancement layer is rotated by the angle $\theta$ in counter-clockwise direction.

Figure 16:
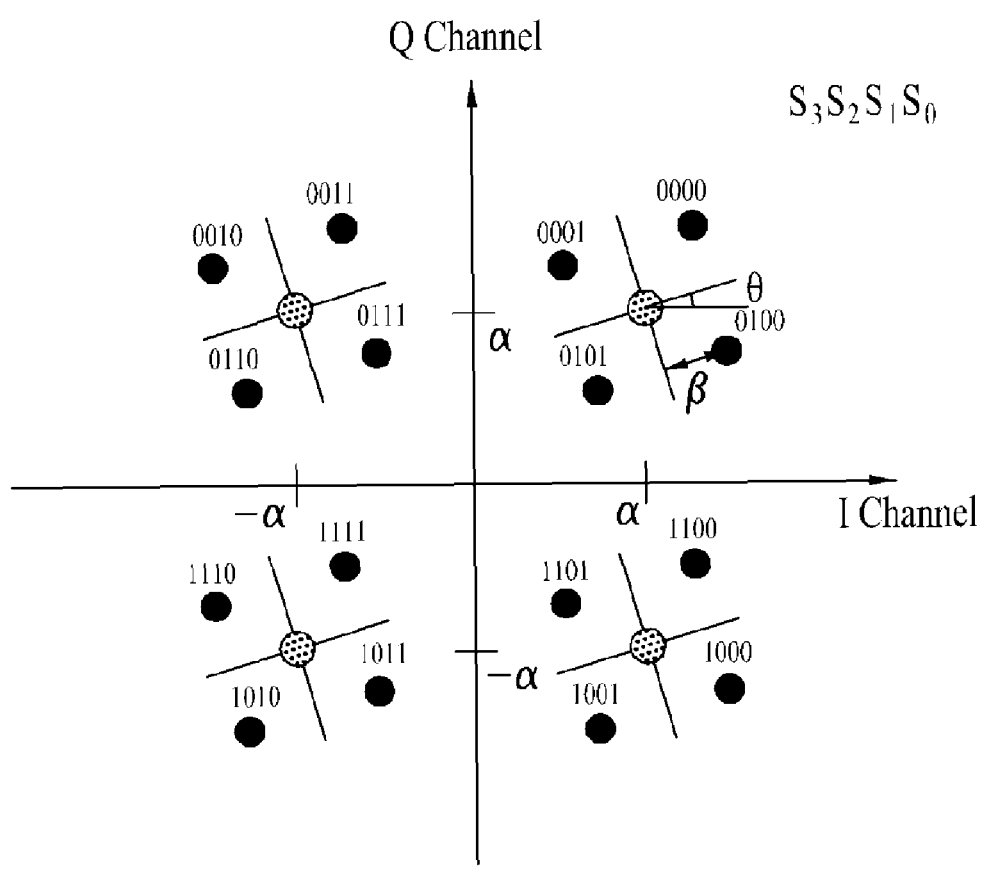
FIG. 16 is an exemplary diagram showing the signal constellation of the layered modulator with respect to QPSK/QPSK hierarchical modulation in accordance with one embodiment.

FIG. 16 is an exemplary diagram showing the signal constellation of the layered modulator with respect to QPSK/QPSK hierarchical modulation. Referring to QPSK/QPSK hierarchical modulation, which means QPSK base layer and QPSK enhancement layer, each modulation symbol contains four (4) bits, namely, s3, s2, s1, s0. Here, there are two (2) most significant bits (MSBs) which are s3 and s2, and two (2) least significant bits (LSBs) which are s1 and s0. The two (2) MSBs are from the base layer and the two LSBs come from the enhancement layer.

Given energy ratio r between the base layer and enhancement layer, $$\alpha = \sqrt{\frac{r}{2(1+r)}} \text{ and } \beta = \sqrt{\frac{1}{2(1+r)}}$$

can be defined such that $2(\alpha^2+\beta^2)=1$. Here, $\alpha$ denotes the amplitude of the base layer, and $\beta$ denotes the amplitude of enhancement layer. Moreover, $2(\alpha^2+\beta^2)=1$ is a constraint which is also referred to as power constraint and more accurately referred to as normalization.

Table 1 illustrates a layered modulation table with QPSK base layer and QPSK enhancement layer.

TABLE 1

| Modulator Input Bits | | | | Modulation Symbols | |
|---|---|---|---|---|---|
| s3 | s2 | s1 | s0 | $m_I(k)$ | $m_Q(k)$ |
| 0 | 0 | 0 | 0 | $\alpha + \sqrt{2}\cos(\theta + \pi/4)\beta$ | $\alpha + \sqrt{2}\sin(\theta + \pi/4)\beta$ |
| 0 | 0 | 0 | 1 | $\alpha + \sqrt{2}\cos(\theta + 3\pi/4)\beta$ | $\alpha + \sqrt{2}\sin(\theta + 3\pi/4)\beta$ |
| 0 | 1 | 0 | 1 | $\alpha + \sqrt{2}\cos(\theta + 7\pi/4)\beta$ | $\alpha + \sqrt{2}\sin(\theta + 7\pi/4)\beta$ |
| 0 | 1 | 0 | 0 | $\alpha + \sqrt{2}\cos(\theta + 5\pi/4)\beta$ | $\alpha + \sqrt{2}\sin(\theta + 5\pi/4)\beta$ |
| 0 | 0 | 1 | 1 | $-\alpha + \sqrt{2}\cos(\theta + \pi/4)\beta$ | $\alpha + \sqrt{2}\sin(\theta + \pi/4)\beta$ |
| 0 | 0 | 1 | 0 | $-\alpha + \sqrt{2}\cos(\theta + 3\pi/4)\beta$ | $\alpha + \sqrt{2}\sin(\theta + 3\pi/4)\beta$ |
| 0 | 1 | 1 | 0 | $-\alpha + \sqrt{2}\cos(\theta + 7\pi/4)\beta$ | $\alpha + \sqrt{2}\sin(\theta + 7\pi/4)\beta$ |
| 0 | 1 | 1 | 1 | $-\alpha + \sqrt{2}\cos(\theta + 5\pi/4)\beta$ | $\alpha + \sqrt{2}\sin(\theta + 5\pi/4)\beta$ |
| 1 | 1 | 0 | 0 | $\alpha + \sqrt{2}\cos(\theta + \pi/4)\beta$ | $-\alpha + \sqrt{2}\sin(\theta + \pi/4)\beta$ |
| 1 | 1 | 0 | 1 | $\alpha + \sqrt{2}\cos(\theta + 3\pi/4)\beta$ | $-\alpha + \sqrt{2}\sin(\theta + 3\pi/4)\beta$ |
| 1 | 0 | 0 | 1 | $\alpha + \sqrt{2}\cos(\theta + 7\pi/4)\beta$ | $-\alpha + \sqrt{2}\sin(\theta + 7\pi/4)\beta$ |
| 1 | 0 | 0 | 0 | $\alpha + \sqrt{2}\cos(\theta + 5\pi/4)\beta$ | $-\alpha + \sqrt{2}\sin(\theta + 5\pi/4)\beta$ |
| 1 | 1 | 1 | 1 | $-\alpha + \sqrt{2}\cos(\theta + \pi/4)\beta$ | $-\alpha + \sqrt{2}\sin(\theta + \pi/4)\beta$ |
| 1 | 1 | 1 | 0 | $-\alpha + \sqrt{2}\cos(\theta + 3\pi/4)\beta$ | $-\alpha + \sqrt{2}\sin(\theta + 3\pi/4)\beta$ |
| 1 | 0 | 1 | 0 | $-\alpha + \sqrt{2}\cos(\theta + 7\pi/4)\beta$ | $-\alpha + \sqrt{2}\sin(\theta + 7\pi/4)\beta$ |
| 1 | 0 | 1 | 1 | $-\alpha + \sqrt{2}\cos(\theta + 5\pi/4)\beta$ | $-\alpha + \sqrt{2}\sin(\theta + 5\pi/4)\beta$ |

Referring to Table 1, each column defines the symbol position for each four (4) bits, s3, s2, s1, s0. Here, the position of each symbol is given in a two-dimensional signal space ($m_I$, $m_Q$). This means that each symbol can be represented by $S(t) = \lfloor M_I \cos(2\pi f_0 t + \phi_0) + M_Q * \sin(2\pi f_0 t + \phi_0) \rfloor \phi(t)$. Simply put, the complex modulation symbol $S = (m_I, m_Q)$ for each [s3, s2, s1, s0] is specified in $S(t) = \lfloor M_I \cos(2\pi f_0 t + \phi_0) + M_Q * \sin(2\pi f_0 t + \phi_0) \rfloor \phi(t)$.

Here, $\cos(2\pi f_0 t + \phi_0)$ and $\sin(2\pi f_0 t + \phi_0)$ denote the carrier signal with initial phase $\phi_0$ and carrier frequency $f_0$. Moreover, $\phi(t)$ denotes the pulse-shaping, the shape of a transmit symbol.

In the above definition of S(t), except the $m_I$ and $m_Q$ value, other parameters can usually either be shared between the transmitter and the receiver or be detected by the receiver itself. For correctly demodulating S(t), it is necessary to define and share the possible value information of $m_I$ and $m_Q$.

The possible value of $m_I(k)$ and $m_Q(k)$, which denote the $m_I$ and $m_Q$ value for the kth symbol, are given in Table 1. It shows for representing each group inputs bits s3, s2, s1, s0 the symbol shall be modulated by corresponding parameters shown in the table.

The discussion with respect to the complex modulation symbol can be applied in a similar or same manner to the following discussions of various layered modulations. That is, the above discussion of the complex modulation symbol can be applied to the tables to follow.

Figure 17:
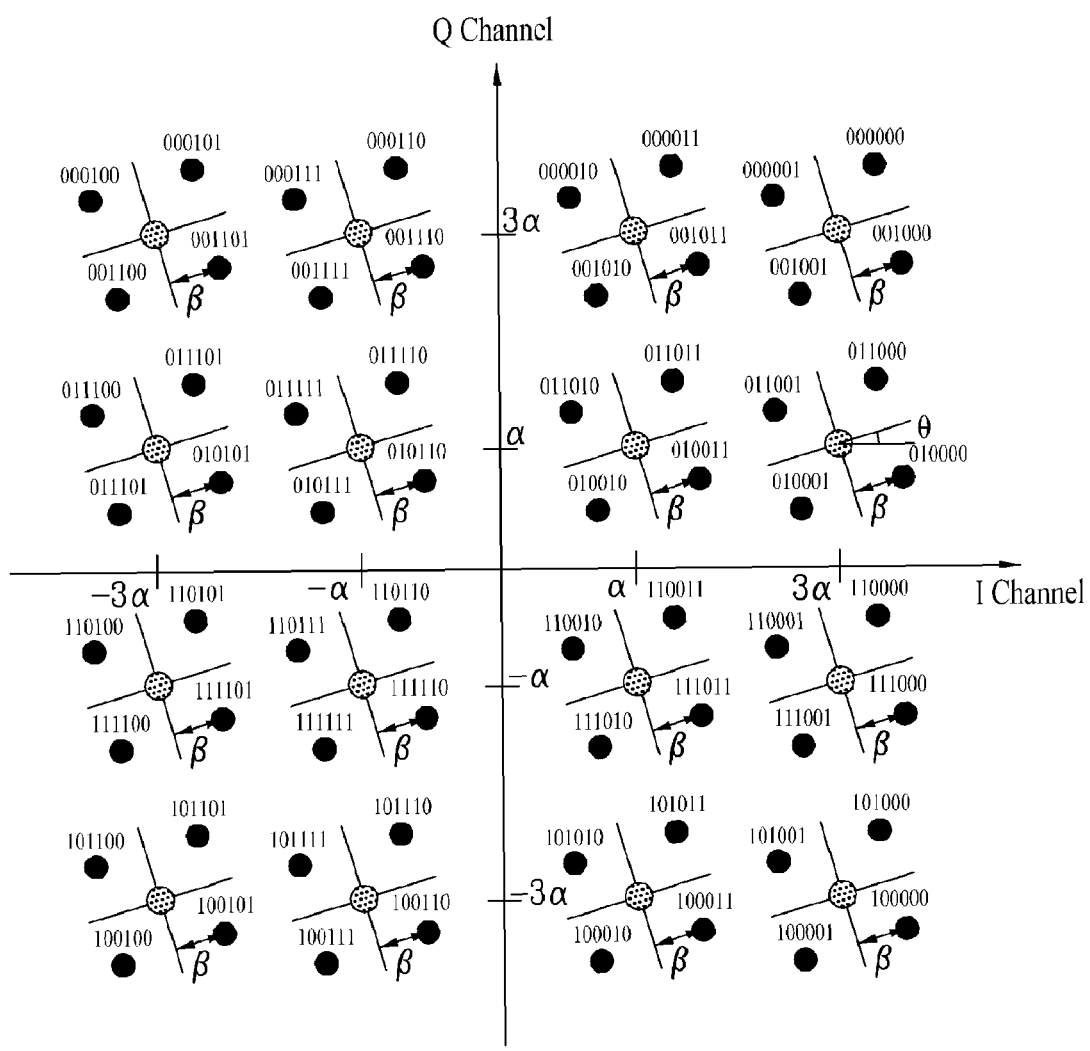
FIG. 17 is an exemplary diagram illustrating the signal constellation of the layered modulator with respect to 16QAM/QPSK hierarchical modulation in accordance with one embodiment.

FIG. 17 is an exemplary diagram illustrating the signal constellation of the layered modulator with respect to 16QAM/QPSK hierarchical modulation. Referring to 16QAM/QPSK hierarchical modulation, which means 16QAM base layer and QPSK enhancement layer, each modulation symbol contains six 6 bits—s5, s4, s3, s2, s1, s0. The four (4) MSBs, s5, s4, s3 and s2, come from the base layer, and the two (2) LSBs, s1 and s0, come from the enhancement layer.

Given energy ratio r between the base layer and enhancement layer, $$\alpha = \sqrt{\frac{r}{2(1+r)}} \text{ and } \beta = \sqrt{\frac{1}{2(1+r)}}$$

can be defined such that $2(\alpha^2 + \beta^2) = 1$. Here, $\alpha$ denotes the amplitude of the base layer, and $\beta$ denotes the amplitude of enhancement layer. Moreover, $2(\alpha^2 + \beta^2) = 1$ is a constraint which is also referred to as power constraint and more accurately referred to as normalization.

Table 2 illustrates a layered modulation table with 16QAM base layer and QPSK enhancement layer.

TABLE 2

| Modulator Input Bits | | | | | | Modulation Symbols | |
|---|---|---|---|---|---|---|---|
| $s_5$ | $s_4$ | $s_3$ | $s_2$ | $s_1$ | $s_0$ | $m_I(k)$ | $m_Q(k)$ |
| 0 | 0 | 0 | 0 | 0 | 0 | $3\alpha + \sqrt{2}\cos(\theta + \pi/4)\beta$ | $3\alpha + \sqrt{2}\sin(\theta + \pi/4)\beta$ |
| 0 | 0 | 0 | 0 | 0 | 1 | $3\alpha + \sqrt{2}\cos(\theta + 3\pi/4)\beta$ | $3\alpha + \sqrt{2}\sin(\theta + 3\pi/4)\beta$ |
| 0 | 0 | 1 | 0 | 0 | 1 | $3\alpha + \sqrt{2}\cos(\theta + 7\pi/4)\beta$ | $3\alpha + \sqrt{2}\sin(\theta + 7\pi/4)\beta$ |
| 0 | 0 | 1 | 0 | 0 | 0 | $3\alpha + \sqrt{2}\cos(\theta + 5\pi/4)\beta$ | $3\alpha + \sqrt{2}\sin(\theta + 5\pi/4)\beta$ |
| 0 | 0 | 0 | 0 | 1 | 1 | $\alpha + \sqrt{2}\cos(\theta + \pi/4)\beta$ | $3\alpha + \sqrt{2}\sin(\theta + \pi/4)\beta$ |
| 0 | 0 | 0 | 0 | 1 | 0 | $\alpha + \sqrt{2}\cos(\theta + 3\pi/4)\beta$ | $3\alpha + \sqrt{2}\sin(\theta + 3\pi/4)\beta$ |
| 0 | 0 | 1 | 0 | 1 | 0 | $\alpha + \sqrt{2}\cos(\theta + 7\pi/4)\beta$ | $3\alpha + \sqrt{2}\sin(\theta + 7\pi/4)\beta$ |
| 0 | 0 | 1 | 0 | 1 | 1 | $\alpha + \sqrt{2}\cos(\theta + 5\pi/4)\beta$ | $3\alpha + \sqrt{2}\sin(\theta + 5\pi/4)\beta$ |
| 0 | 0 | 0 | 1 | 0 | 1 | $-3\alpha + \sqrt{2}\cos(\theta + \pi/4)\beta$ | $3\alpha + \sqrt{2}\sin(\theta + \pi/4)\beta$ |
| 0 | 0 | 0 | 1 | 0 | 0 | $-3\alpha + \sqrt{2}\cos(\theta + 3\pi/4)\beta$ | $3\alpha + \sqrt{2}\sin(\theta + 3\pi/4)\beta$ |
| 0 | 0 | 1 | 1 | 0 | 0 | $-3\alpha + \sqrt{2}\cos(\theta + 7\pi/4)\beta$ | $3\alpha + \sqrt{2}\sin(\theta + 7\pi/4)\beta$ |
| 0 | 0 | 1 | 1 | 0 | 1 | $-3\alpha + \sqrt{2}\cos(\theta + 5\pi/4)\beta$ | $3\alpha + \sqrt{2}\sin(\theta + 5\pi/4)\beta$ |
| 0 | 0 | 0 | 1 | 1 | 0 | $-\alpha + \sqrt{2}\cos(\theta + \pi/4)\beta$ | $3\alpha + \sqrt{2}\sin(\theta + \pi/4)\beta$ |
| 0 | 0 | 0 | 1 | 1 | 1 | $-\alpha + \sqrt{2}\cos(\theta + 3\pi/4)\beta$ | $3\alpha + \sqrt{2}\sin(\theta + 3\pi/4)\beta$ |
| 0 | 0 | 1 | 1 | 1 | 1 | $-\alpha + \sqrt{2}\cos(\theta + 7\pi/4)\beta$ | $3\alpha + \sqrt{2}\sin(\theta + 7\pi/4)\beta$ |
| 0 | 0 | 1 | 1 | 1 | 0 | $-\alpha + \sqrt{2}\cos(\theta + 5\pi/4)\beta$ | $3\alpha + \sqrt{2}\sin(\theta + 5\pi/4)\beta$ |
| 0 | 1 | 1 | 0 | 0 | 0 | $3\alpha + \sqrt{2}\cos(\theta + \pi/4)\beta$ | $\alpha + \sqrt{2}\sin(\theta + \pi/4)\beta$ |
| 0 | 1 | 1 | 0 | 0 | 1 | $3\alpha + \sqrt{2}\cos(\theta + 3\pi/4)\beta$ | $\alpha + \sqrt{2}\sin(\theta + 3\pi/4)\beta$ |
| 0 | 1 | 0 | 0 | 0 | 1 | $3\alpha + \sqrt{2}\cos(\theta + 7\pi/4)\beta$ | $\alpha + \sqrt{2}\sin(\theta + 7\pi/4)\beta$ |
| 0 | 1 | 0 | 0 | 0 | 0 | $3\alpha + \sqrt{2}\cos(\theta + 5\pi/4)\beta$ | $\alpha + \sqrt{2}\sin(\theta + 5\pi/4)\beta$ |
| 0 | 1 | 1 | 0 | 1 | 1 | $\alpha + \sqrt{2}\cos(\theta + \pi/4)\beta$ | $\alpha + \sqrt{2}\sin(\theta + \pi/4)\beta$ |
| 0 | 1 | 1 | 0 | 1 | 0 | $\alpha + \sqrt{2}\cos(\theta + 3\pi/4)\beta$ | $\alpha + \sqrt{2}\sin(\theta + 3\pi/4)\beta$ |
| 0 | 1 | 0 | 0 | 1 | 0 | $\alpha + \sqrt{2}\cos(\theta + 7\pi/4)\beta$ | $\alpha + \sqrt{2}\sin(\theta + 7\pi/4)\beta$ |
| 0 | 1 | 0 | 0 | 1 | 1 | $\alpha + \sqrt{2}\cos(\theta + 5\pi/4)\beta$ | $\alpha + \sqrt{2}\sin(\theta + 5\pi/4)\beta$ |
| 0 | 1 | 1 | 1 | 0 | 1 | $-3\alpha + \sqrt{2}\cos(\theta + \pi/4)\beta$ | $\alpha + \sqrt{2}\sin(\theta + \pi/4)\beta$ |
| 0 | 1 | 1 | 1 | 0 | 0 | $-3\alpha + \sqrt{2}\cos(\theta + 3\pi/4)\beta$ | $\alpha + \sqrt{2}\sin(\theta + 3\pi/4)\beta$ |
| 0 | 1 | 1 | 1 | 0 | 1 | $-3\alpha + \sqrt{2}\cos(\theta + 7\pi/4)\beta$ | $\alpha + \sqrt{2}\sin(\theta + 7\pi/4)\beta$ |
| 0 | 1 | 0 | 1 | 0 | 1 | $-3\alpha + \sqrt{2}\cos(\theta + 5\pi/4)\beta$ | $\alpha + \sqrt{2}\sin(\theta + 5\pi/4)\beta$ |
| 0 | 1 | 1 | 1 | 1 | 0 | $-\alpha + \sqrt{2}\cos(\theta + \pi/4)\beta$ | $\alpha + \sqrt{2}\sin(\theta + \pi/4)\beta$ |
| 0 | 1 | 1 | 1 | 1 | 1 | $-\alpha + \sqrt{2}\cos(\theta + 3\pi/4)\beta$ | $\alpha + \sqrt{2}\sin(\theta + 3\pi/4)\beta$ |
| 0 | 1 | 0 | 1 | 1 | 1 | $-\alpha + \sqrt{2}\cos(\theta + 7\pi/4)\beta$ | $\alpha + \sqrt{2}\sin(\theta + 7\pi/4)\beta$ |
| 0 | 1 | 0 | 1 | 1 | 0 | $-\alpha + \sqrt{2}\cos(\theta + 5\pi/4)\beta$ | $\alpha + \sqrt{2}\sin(\theta + 5\pi/4)\beta$ |
| 1 | 0 | 1 | 0 | 0 | 0 | $3\alpha + \sqrt{2}\cos(\theta + \pi/4)\beta$ | $-3\alpha + \sqrt{2}\sin(\theta + \pi/4)\beta$ |
| 1 | 0 | 1 | 0 | 0 | 1 | $3\alpha + \sqrt{2}\cos(\theta + 3\pi/4)\beta$ | $-3\alpha + \sqrt{2}\sin(\theta + 3\pi/4)\beta$ |
| 1 | 0 | 0 | 0 | 0 | 1 | $3\alpha + \sqrt{2}\cos(\theta + 7\pi/4)\beta$ | $-3\alpha + \sqrt{2}\sin(\theta + 7\pi/4)\beta$ |
| 1 | 0 | 0 | 0 | 0 | 0 | $3\alpha + \sqrt{2}\cos(\theta + 5\pi/4)\beta$ | $-3\alpha + \sqrt{2}\sin(\theta + 5\pi/4)\beta$ |
| 1 | 0 | 1 | 0 | 1 | 1 | $\alpha + \sqrt{2}\cos(\theta + \pi/4)\beta$ | $-3\alpha + \sqrt{2}\sin(\theta + \pi/4)\beta$ |
| 1 | 0 | 1 | 0 | 1 | 0 | $\alpha + \sqrt{2}\cos(\theta + 3\pi/4)\beta$ | $-3\alpha + \sqrt{2}\sin(\theta + 3\pi/4)\beta$ |
| 1 | 0 | 0 | 0 | 1 | 0 | $\alpha + \sqrt{2}\cos(\theta + 7\pi/4)\beta$ | $-3\alpha + \sqrt{2}\sin(\theta + 7\pi/4)\beta$ |
| 1 | 0 | 0 | 0 | 1 | 1 | $\alpha + \sqrt{2}\cos(\theta + 5\pi/4)\beta$ | $-3\alpha + \sqrt{2}\sin(\theta + 5\pi/4)\beta$ |
| 1 | 0 | 1 | 1 | 0 | 1 | $-3\alpha + \sqrt{2}\cos(\theta + \pi/4)\beta$ | $-3\alpha + \sqrt{2}\sin(\theta + \pi/4)\beta$ |
| 1 | 0 | 1 | 1 | 0 | 0 | $-3\alpha + \sqrt{2}\cos(\theta + 3\pi/4)\beta$ | $-3\alpha + \sqrt{2}\sin(\theta + 3\pi/4)\beta$ |
| 1 | 0 | 0 | 1 | 0 | 0 | $-3\alpha + \sqrt{2}\cos(\theta + 7\pi/4)\beta$ | $-3\alpha + \sqrt{2}\sin(\theta + 7\pi/4)\beta$ |
| 1 | 0 | 0 | 1 | 0 | 1 | $-3\alpha + \sqrt{2}\cos(\theta + 5\pi/4)\beta$ | $-3\alpha + \sqrt{2}\sin(\theta + 5\pi/4)\beta$ |

TABLE 2-continued

| | Modulator Input Bits | | | | | Modulation Symbols | |
|---|---|---|---|---|---|---|---|
| $s_5$ | $s_4$ | $s_3$ | $s_2$ | $s_1$ | $s_0$ | $m_I(k)$ | $m_Q(k)$ |
| 1 | 0 | 1 | 1 | 1 | 0 | $-\alpha + \sqrt{2}\cos(\theta + \pi/4)\beta$ | $-3\alpha + \sqrt{2}\sin(\theta + \pi/4)\beta$ |
| 1 | 0 | 1 | 1 | 1 | 1 | $-\alpha + \sqrt{2}\cos(\theta + 3\pi/4)\beta$ | $-3\alpha + \sqrt{2}\sin(\theta + 3\pi/4)\beta$ |
| 1 | 0 | 0 | 1 | 1 | 1 | $-\alpha + \sqrt{2}\cos(\theta + 7\pi/4)\beta$ | $-3\alpha + \sqrt{2}\sin(\theta + 7\pi/4)\beta$ |
| 1 | 0 | 0 | 1 | 1 | 0 | $-\alpha + \sqrt{2}\cos(\theta + 5\pi/4)\beta$ | $-3\alpha + \sqrt{2}\sin(\theta + 5\pi/4)\beta$ |
| 1 | 1 | 0 | 1 | 0 | 1 | $3\alpha + \sqrt{2}\cos(\theta + \pi/4)\beta$ | $-\alpha + \sqrt{2}\sin(\theta + \pi/4)\beta$ |
| 1 | 1 | 0 | 1 | 0 | 0 | $3\alpha + \sqrt{2}\cos(\theta + 3\pi/4)\beta$ | $-\alpha + \sqrt{2}\sin(\theta + 3\pi/4)\beta$ |
| 1 | 1 | 1 | 1 | 0 | 0 | $3\alpha + \sqrt{2}\cos(\theta + 7\pi/4)\beta$ | $-\alpha + \sqrt{2}\sin(\theta + 7\pi/4)\beta$ |
| 1 | 1 | 1 | 1 | 0 | 1 | $3\alpha + \sqrt{2}\cos(\theta + 5\pi/4)\beta$ | $-\alpha + \sqrt{2}\sin(\theta + 5\pi/4)\beta$ |
| 1 | 1 | 0 | 1 | 1 | 0 | $\alpha + \sqrt{2}\cos(\theta + \pi/4)\beta$ | $-\alpha + \sqrt{2}\sin(\theta + \pi/4)\beta$ |
| 1 | 1 | 0 | 1 | 1 | 1 | $\alpha + \sqrt{2}\cos(\theta + 3\pi/4)\beta$ | $-\alpha + \sqrt{2}\sin(\theta + 3\pi/4)\beta$ |
| 1 | 1 | 1 | 1 | 1 | 1 | $\alpha + \sqrt{2}\cos(\theta + 7\pi/4)\beta$ | $-\alpha + \sqrt{2}\sin(\theta + 7\pi/4)\beta$ |
| 1 | 1 | 1 | 1 | 1 | 0 | $\alpha + \sqrt{2}\cos(\theta + 5\pi/4)\beta$ | $-\alpha + \sqrt{2}\sin(\theta + 5\pi/4)\beta$ |
| 1 | 1 | 0 | 0 | 0 | 1 | $-3\alpha + \sqrt{2}\cos(\theta + \pi/4)\beta$ | $-\alpha + \sqrt{2}\sin(\theta + \pi/4)\beta$ |
| 1 | 1 | 0 | 0 | 0 | 0 | $-3\alpha + \sqrt{2}\cos(\theta + 3\pi/4)\beta$ | $-\alpha + \sqrt{2}\sin(\theta + 3\pi/4)\beta$ |
| 1 | 1 | 1 | 0 | 0 | 0 | $-3\alpha + \sqrt{2}\cos(\theta + 7\pi/4)\beta$ | $-\alpha + \sqrt{2}\sin(\theta + 7\pi/4)\beta$ |
| 1 | 1 | 1 | 0 | 0 | 1 | $-\alpha + \sqrt{2}\cos(\theta + 5\pi/4)\beta$ | $-\alpha + \sqrt{2}\sin(\theta + 5\pi/4)\beta$ |
| 1 | 1 | 0 | 0 | 1 | 0 | $-\alpha + \sqrt{2}\cos(\theta + \pi/4)\beta$ | $-\alpha + \sqrt{2}\sin(\theta + \pi/4)\beta$ |
| 1 | 1 | 0 | 0 | 1 | 1 | $-\alpha + \sqrt{2}\cos(\theta + 3\pi/4)\beta$ | $-\alpha + \sqrt{2}\sin(\theta + 3\pi/4)\beta$ |
| 1 | 1 | 1 | 1 | 1 | 1 | $-\alpha + \sqrt{2}\cos(\theta + 7\pi/4)\beta$ | $-\alpha + \sqrt{2}\sin(\theta + 7\pi/4)\beta$ |
| 1 | 1 | 1 | 1 | 1 | 0 | $-\alpha + \sqrt{2}\cos(\theta + 5\pi/4)\beta$ | $-\alpha + \sqrt{2}\sin(\theta + 5\pi/4)\beta$ |

Referring to Table 2, each column defines the symbol position for each six (6) bits, s5, s4, s3, s2, s1, s0. Here, the position of each symbol is given in a two-dimensional signal space ($m_I$, $m_Q$). This means that each symbol can be represented by $S(t) = \lfloor M_I \cos(2\pi f_0 t + \phi_0) + M_Q^* \sin(2\pi f_0 t + \phi) \rfloor \phi(t)$. Simply put, the complex modulation symbol $S = (m_I, m_Q)$ for each [s5, s4, s3, s2, s1, s0] is specified in $S(t) = \lfloor M_I \cos(2\pi f_0 t + \phi_0) + M_Q^* \sin(2\pi f_0 t + \phi) \rfloor \phi(t)$.

Here, $w_0$ denotes carrier frequency, $\pi_0$ denotes an initial phase of the carrier, and $\phi(t)$ denotes the symbol shaping or pulse shaping wave. Here, $\cos(2\pi f_0 t + \phi_0)$ and $\sin(2\pi f_0 t + \phi_0)$ denote the carrier signal with initial phase $\phi_0$ and carrier frequency $f_0$. Moreover, $\phi(t)$ denotes the pulse-shaping, the shape of a transmit symbol.

In the above definition of $S(t)$, except the $m_I$ and $m_Q$ value, other parameters can usually either be shared between the transmitter and the receiver or be detected by the receiver itself. For correctly demodulating $S(t)$, it is necessary to define and share the possible value information of $m_I$ and $m_Q$.

The possible value of $m_I(k)$ and $m_Q(k)$, which denote the $m_I$ and $m_Q$ value for the kth symbol, are given in Table 1. It shows for representing each group inputs bits s5, s4, s3, s2, s1, s0 the symbol shall be modulated by corresponding parameters shown in the table.

An example of BCMCS for hierarchical modulation is discussed below. Layered modulation can be a superposition of any two modulation schemes. In BCMCS, a QPSK enhancement layer is superposed on a base QPSK or 16-QAM layer to obtain the resultant signal constellation. The energy ratio r is the power ratio between the base layer and the enhancement. In one embodiment, the enhancement layer is rotated by the angle θ in counter-clockwise direction.

Figure 18:
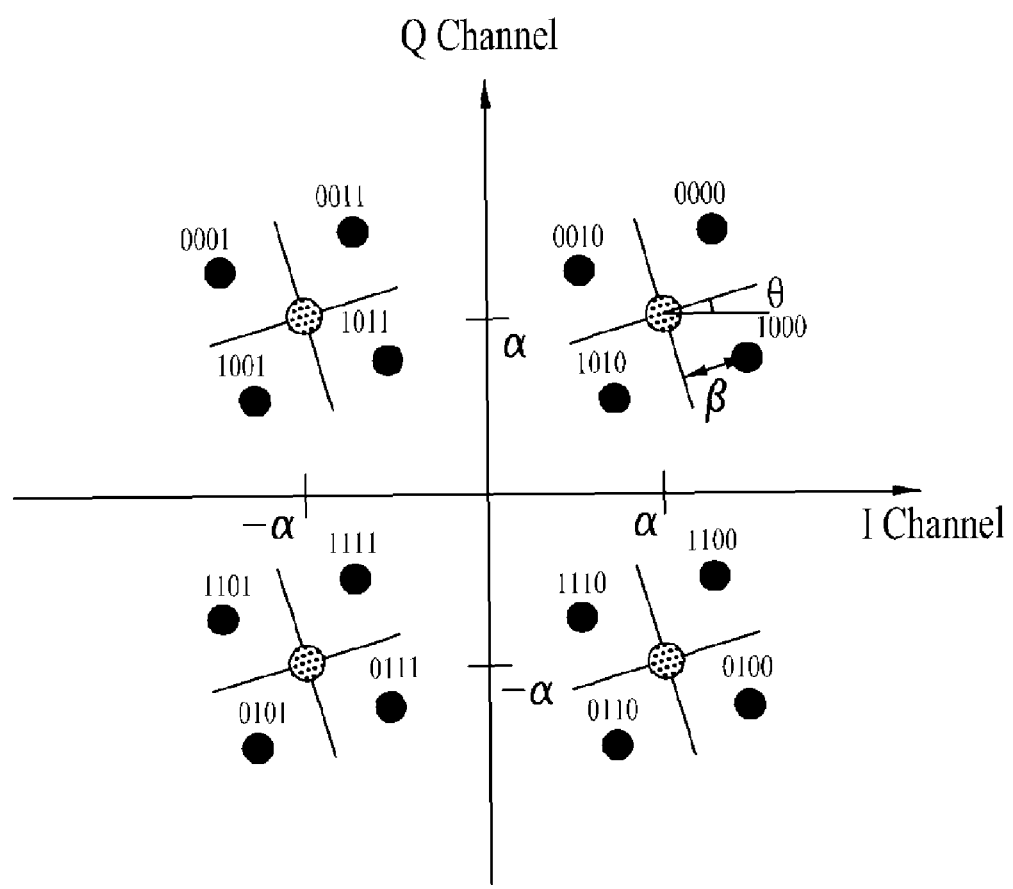
FIG. 18 is an exemplary diagram showing the signal constellation for the layered modulator with QPSK/QPSK hierarchical modulation in accordance with one embodiment.

FIG. 18 is an exemplary diagram showing the signal constellation for the layered modulator with QPSK/QPSK hierarchical modulation. Referring to QPSK/QPSK hierarchical modulation, which means QPSK base layer and QPSK enhancement layer, each modulation symbol contains four (4) bits, namely, s3, s2, s1, s0. Here, there are two (2) MSBs which are s3 and s2, and two (2) LSBs which are s1 and s0. The two (2) MSBs are from the base layer and the two LSBs come from the enhancement layer.

Given energy ratio r between the base layer and enhancement layer, $$\alpha = \sqrt{\frac{r}{2(1+r)}} \text{ and } \beta = \sqrt{\frac{1}{2(1+r)}}$$

can be defined such that $2(\alpha^2 + \beta^2)$. Here, α denotes the amplitude of the base layer, and β denotes the amplitude of enhancement layer. Moreover, $2(\alpha^2 + \beta^2) = 1$ is a constraint which is also referred to as power constraint and more accurately referred to as normalization.

Table 3 illustrates a layered modulation table with QPSK base layer and QPSK enhancement layer.

TABLE 3

| Modulator Input Bits | | | | Modulation Symbols | |
|---|---|---|---|---|---|
| $s_3$ | $s_2$ | $s_1$ | $s_0$ | $m_I(k)$ | $m_Q(k)$ |
| 0 | 0 | 0 | 0 | $\alpha + \sqrt{2}\cos(\theta + \pi/4)\beta$ | $\alpha + \sqrt{2}\sin(\theta + \pi/4)\beta$ |
| 0 | 0 | 1 | 0 | $\alpha + \sqrt{2}\cos(\theta + 3\pi/4)\beta$ | $\alpha + \sqrt{2}\sin(\theta + 3\pi/4)\beta$ |
| 1 | 0 | 0 | 0 | $\alpha + \sqrt{2}\cos(\theta + 7\pi/4)\beta$ | $\alpha + \sqrt{2}\sin(\theta + 7\pi/4)\beta$ |
| 1 | 0 | 1 | 0 | $\alpha + \sqrt{2}\cos(\theta + 5\pi/4)\beta$ | $\alpha + \sqrt{2}\sin(\theta + 5\pi/4)\beta$ |
| 0 | 0 | 0 | 1 | $-\alpha + \sqrt{2}\cos(\theta + \pi/4)\beta$ | $\alpha + \sqrt{2}\sin(\theta + \pi/4)\beta$ |
| 0 | 0 | 0 | 1 | $-\alpha + \sqrt{2}\cos(\theta + 3\pi/4)\beta$ | $\alpha + \sqrt{2}\sin(\theta + 3\pi/4)\beta$ |
| 1 | 0 | 1 | 1 | $-\alpha + \sqrt{2}\cos(\theta + 7\pi/4)\beta$ | $\alpha + \sqrt{2}\sin(\theta + 7\pi/4)\beta$ |
| 1 | 0 | 0 | 1 | $-\alpha + \sqrt{2}\cos(\theta + 5\pi/4)\beta$ | $\alpha + \sqrt{2}\sin(\theta + 5\pi/4)\beta$ |
| 1 | 1 | 0 | 0 | $\alpha + \sqrt{2}\cos(\theta + \pi/4)\beta$ | $-\alpha + \sqrt{2}\sin(\theta + \pi/4)\beta$ |
| 1 | 1 | 1 | 0 | $\alpha + \sqrt{2}\cos(\theta + 3\pi/4)\beta$ | $-\alpha + \sqrt{2}\sin(\theta + 3\pi/4)\beta$ |
| 0 | 1 | 0 | 0 | $\alpha + \sqrt{2}\cos(\theta + 7\pi/4)\beta$ | $-\alpha + \sqrt{2}\sin(\theta + 7\pi/4)\beta$ |
| 0 | 1 | 1 | 0 | $\alpha + \sqrt{2}\cos(\theta + 5\pi/4)\beta$ | $-\alpha + \sqrt{2}\sin(\theta + 5\pi/4)\beta$ |
| 1 | 1 | 1 | 1 | $-\alpha + \sqrt{2}\cos(\theta + \pi/4)\beta$ | $-\alpha + \sqrt{2}\sin(\theta + \pi/4)\beta$ |
| 1 | 1 | 0 | 1 | $-\alpha + \sqrt{2}\cos(\theta + 3\pi/4)\beta$ | $-\alpha + \sqrt{2}\sin(\theta + 3\pi/4)\beta$ |
| 0 | 1 | 1 | 1 | $-\alpha + \sqrt{2}\cos(\theta + 7\pi/4)\beta$ | $-\alpha + \sqrt{2}\sin(\theta + 7\pi/4)\beta$ |
| 0 | 1 | 0 | 1 | $-\alpha + \sqrt{2}\cos(\theta + 5\pi/4)\beta$ | $-\alpha + \sqrt{2}\sin(\theta + 5\pi/4)\beta$ |

Referring to Table 3, each column defines the symbol position for each four (4) bits, s3, s2, s1, s0. Here, the position of each symbol is given in a two-dimensional signal space ($m_I$, $m_Q$). This means that each symbol can be represented by $S(t) = 537 M_I \cos(2\pi f_0 t + \phi_0) + M_Q^* \sin(2\pi f_0 t + \phi_0) \rfloor \phi(t)$. Simply put, the complex modulation symbol $S=(m_I, m_Q)$ for each [s3, s2, s1, s0] is specified in $S(t)=[M_I \cos(2\pi f_0 t+\phi_0)+M_Q^* \sin(2\pi f_0 t+\phi_0)]\phi(t)$.

Here, $\cos(2\pi f_0 t+\phi_0)$ and $\sin(2\pi f_0 t+\phi_0)$ denote the carrier signal with initial phase $\phi_0$ and carrier frequency $f_0$. Moreover, $\phi(t)$ denotes the pulse-shaping, the shape of a transmit symbol.

In the above definition of S(t), except the $m_I$ and $m_Q$ value, other parameters can usually either be shared between the transmitter and the receiver or be detected by the receiver itself. For correctly demodulating S(t), it is necessary to define and share the possible value information of $m_I$ and $m_Q$.

The possible value of $m_I(k)$ and $m_Q(k)$, which denote the $m_I$ and $m_Q$ value for the kth symbol, are given in Table 1. It shows for representing each group inputs bits s3, s2, s1, s0 the symbol shall be modulated by corresponding parameters shown in the table.

Figure 19:
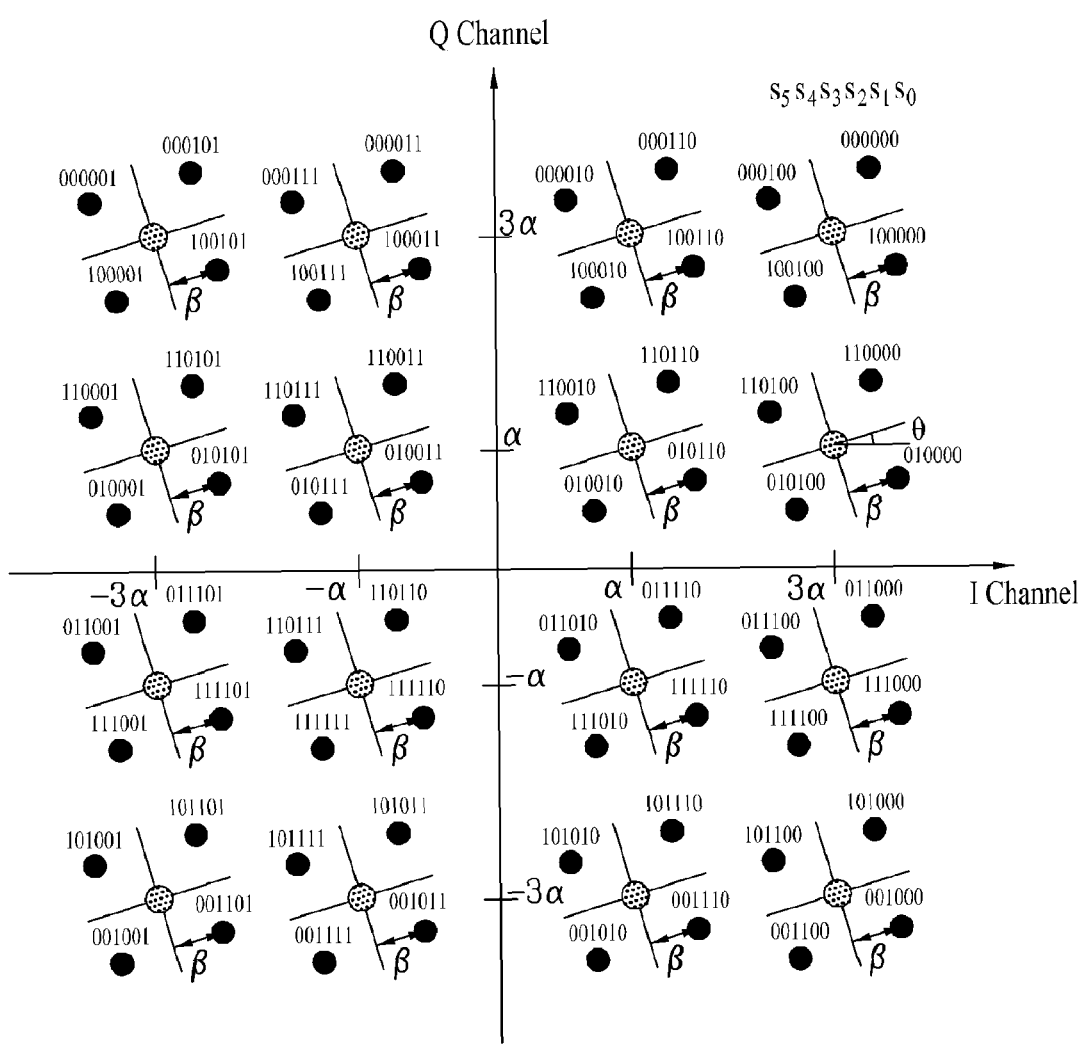
FIG. 19 is an exemplary diagram illustrating the signal constellation of the layered modulator with respect to 16QAM/QPSK hierarchical modulation in accordance with one embodiment.

FIG. 19 is an exemplary diagram illustrating the signal constellation of the layered modulator with respect to 16QAM/QPSK hierarchical modulation. Referring to another 16QAM/QPSK hierarchical modulation, which means 16QAM base layer and QPSK enhancement layer, each modulation symbol contains six (6) bits—s5, s4, s3, s2, s1, s0. The four (4) MSBs, s5, s4, s3 and s2, come from the base layer, and the two (2) LSBs, s1 and s0, come from the enhancement layer.

Given energy ratio r between the base layer and enhancement layer, $$\alpha = \sqrt{\frac{r}{2(1+r)}} \text{ and } \beta = \sqrt{\frac{1}{2(1+r)}}$$

can be defined such that $2(\alpha^2+\beta^2)=1$. Here, $\alpha$ denotes the amplitude of the base layer, and $\beta$ denotes the amplitude of enhancement layer. Moreover, $2(\alpha^2+\beta^2)=1$ is a constraint which is also referred to as power constraint and more accurately referred to as normalization.

Table 4 illustrates a layered modulation table with 16QAM base layer and QPSK enhancement layer.

TABLE 4

| Modulator Input Bits | | | | | | Modulation Symbols | |
|---|---|---|---|---|---|---|---|
| $s_5$ | $s_4$ | $s_3$ | $s_2$ | $s_1$ | $s_0$ | $m_I(k)$ | $m_Q(k)$ |
| 0 | 0 | 0 | 0 | 0 | 0 | $3\alpha + \sqrt{2}\cos(\theta+\pi/4)\beta$ | $3\alpha + \sqrt{2}\sin(\theta+\pi/4)\beta$ |
| 0 | 0 | 0 | 1 | 0 | 0 | $3\alpha + \sqrt{2}\cos(\theta+3\pi/4)\beta$ | $3\alpha + \sqrt{2}\sin(\theta+3\pi/4)\beta$ |
| 1 | 0 | 0 | 0 | 0 | 0 | $3\alpha + \sqrt{2}\cos(\theta+7\pi/4)\beta$ | $3\alpha + \sqrt{2}\sin(\theta+7\pi/4)\beta$ |
| 1 | 0 | 0 | 1 | 0 | 0 | $3\alpha + \sqrt{2}\cos(\theta+5\pi/4)\beta$ | $3\alpha + \sqrt{2}\sin(\theta+5\pi/4)\beta$ |
| 0 | 0 | 0 | 1 | 1 | 0 | $\alpha + \sqrt{2}\cos(\theta+\pi/4)\beta$ | $3\alpha + \sqrt{2}\sin(\theta+\pi/4)\beta$ |
| 0 | 0 | 0 | 0 | 1 | 0 | $\alpha + \sqrt{2}\cos(\theta+3\pi/4)\beta$ | $3\alpha + \sqrt{2}\sin(\theta+3\pi/4)\beta$ |
| 1 | 0 | 0 | 1 | 1 | 0 | $\alpha + \sqrt{2}\cos(\theta+7\pi/4)\beta$ | $3\alpha + \sqrt{2}\sin(\theta+7\pi/4)\beta$ |
| 1 | 0 | 0 | 0 | 1 | 0 | $\alpha + \sqrt{2}\cos(\theta+5\pi/4)\beta$ | $3\alpha + \sqrt{2}\sin(\theta+5\pi/4)\beta$ |
| 0 | 0 | 0 | 1 | 0 | 1 | $-3\alpha + \sqrt{2}\cos(\theta+\pi/4)\beta$ | $3\alpha + \sqrt{2}\sin(\theta+\pi/4)\beta$ |
| 0 | 0 | 0 | 0 | 0 | 1 | $-3\alpha + \sqrt{2}\cos(\theta+3\pi/4)\beta$ | $3\alpha + \sqrt{2}\sin(\theta+3\pi/4)\beta$ |
| 1 | 0 | 0 | 1 | 0 | 1 | $-3\alpha + \sqrt{2}\cos(\theta+7\pi/4)\beta$ | $3\alpha + \sqrt{2}\sin(\theta+7\pi/4)\beta$ |
| 1 | 0 | 0 | 0 | 0 | 1 | $-3\alpha + \sqrt{2}\cos(\theta+5\pi/4)\beta$ | $3\alpha + \sqrt{2}\sin(\theta+5\pi/4)\beta$ |
| 0 | 0 | 0 | 0 | 1 | 1 | $-\alpha + \sqrt{2}\cos(\theta+\pi/4)\beta$ | $3\alpha + \sqrt{2}\sin(\theta+\pi/4)\beta$ |
| 0 | 0 | 0 | 1 | 1 | 1 | $-\alpha + \sqrt{2}\cos(\theta+3\pi/4)\beta$ | $3\alpha + \sqrt{2}\sin(\theta+3\pi/4)\beta$ |
| 1 | 0 | 0 | 0 | 1 | 1 | $-\alpha + \sqrt{2}\cos(\theta+7\pi/4)\beta$ | $3\alpha + \sqrt{2}\sin(\theta+7\pi/4)\beta$ |
| 1 | 0 | 0 | 1 | 1 | 1 | $-\alpha + \sqrt{2}\cos(\theta+5\pi/4)\beta$ | $3\alpha + \sqrt{2}\sin(\theta+5\pi/4)\beta$ |
| 1 | 1 | 0 | 0 | 0 | 0 | $3\alpha + \sqrt{2}\cos(\theta+\pi/4)\beta$ | $\alpha + \sqrt{2}\sin(\theta+\pi/4)\beta$ |
| 1 | 1 | 0 | 1 | 0 | 0 | $3\alpha + \sqrt{2}\cos(\theta+3\pi/4)\beta$ | $\alpha + \sqrt{2}\sin(\theta+3\pi/4)\beta$ |
| 0 | 1 | 0 | 0 | 0 | 0 | $3\alpha + \sqrt{2}\cos(\theta+7\pi/4)\beta$ | $\alpha + \sqrt{2}\sin(\theta+7\pi/4)\beta$ |
| 0 | 1 | 0 | 1 | 0 | 0 | $3\alpha + \sqrt{2}\cos(\theta+5\pi/4)\beta$ | $\alpha + \sqrt{2}\sin(\theta+5\pi/4)\beta$ |
| 1 | 1 | 0 | 1 | 1 | 0 | $\alpha + \sqrt{2}\cos(\theta+\pi/4)\beta$ | $\alpha + \sqrt{2}\sin(\theta+\pi/4)\beta$ |
| 1 | 1 | 0 | 0 | 1 | 0 | $\alpha + \sqrt{2}\cos(\theta+3\pi/4)\beta$ | $\alpha + \sqrt{2}\sin(\theta+3\pi/4)\beta$ |
| 0 | 1 | 0 | 1 | 1 | 0 | $\alpha + \sqrt{2}\cos(\theta+7\pi/4)\beta$ | $\alpha + \sqrt{2}\sin(\theta+7\pi/4)\beta$ |
| 0 | 1 | 0 | 0 | 1 | 0 | $\alpha + \sqrt{2}\cos(\theta+5\pi/4)\beta$ | $\alpha + \sqrt{2}\sin(\theta+5\pi/4)\beta$ |
| 1 | 1 | 0 | 1 | 0 | 1 | $-3\alpha + \sqrt{2}\cos(\theta+\pi/4)\beta$ | $\alpha + \sqrt{2}\sin(\theta+\pi/4)\beta$ |
| 1 | 1 | 0 | 0 | 0 | 1 | $-3\alpha + \sqrt{2}\cos(\theta+3\pi/4)\beta$ | $\alpha + \sqrt{2}\sin(\theta+3\pi/4)\beta$ |
| 0 | 1 | 0 | 1 | 0 | 1 | $-3\alpha + \sqrt{2}\cos(\theta+7\pi/4)\beta$ | $\alpha + \sqrt{2}\sin(\theta+7\pi/4)\beta$ |
| 0 | 1 | 0 | 0 | 0 | 1 | $-3\alpha + \sqrt{2}\cos(\theta+5\pi/4)\beta$ | $\alpha + \sqrt{2}\sin(\theta+5\pi/4)\beta$ |
| 1 | 1 | 0 | 0 | 1 | 1 | $-\alpha + \sqrt{2}\cos(\theta+\pi/4)\beta$ | $\alpha + \sqrt{2}\sin(\theta+\pi/4)\beta$ |
| 1 | 1 | 0 | 1 | 1 | 1 | $-\alpha + \sqrt{2}\cos(\theta+3\pi/4)\beta$ | $\alpha + \sqrt{2}\sin(\theta+3\pi/4)\beta$ |
| 0 | 1 | 0 | 0 | 1 | 1 | $-\alpha + \sqrt{2}\cos(\theta+7\pi/4)\beta$ | $\alpha + \sqrt{2}\sin(\theta+7\pi/4)\beta$ |
| 0 | 1 | 0 | 1 | 1 | 1 | $-\alpha + \sqrt{2}\cos(\theta+5\pi/4)\beta$ | $\alpha + \sqrt{2}\sin(\theta+5\pi/4)\beta$ |
| 1 | 0 | 1 | 0 | 0 | 0 | $3\alpha + \sqrt{2}\cos(\theta+\pi/4)\beta$ | $-3\alpha + \sqrt{2}\sin(\theta+\pi/4)\beta$ |
| 1 | 0 | 1 | 1 | 0 | 0 | $3\alpha + \sqrt{2}\cos(\theta+3\pi/4)\beta$ | $-3\alpha + \sqrt{2}\sin(\theta+3\pi/4)\beta$ |
| 0 | 0 | 1 | 0 | 0 | 0 | $3\alpha + \sqrt{2}\cos(\theta+7\pi/4)\beta$ | $-3\alpha + \sqrt{2}\sin(\theta+7\pi/4)\beta$ |
| 0 | 0 | 1 | 1 | 0 | 0 | $3\alpha + \sqrt{2}\cos(\theta+5\pi/4)\beta$ | $-3\alpha + \sqrt{2}\sin(\theta+5\pi/4)\beta$ |
| 1 | 0 | 1 | 1 | 1 | 0 | $\alpha + \sqrt{2}\cos(\theta+\pi/4)\beta$ | $-3\alpha + \sqrt{2}\sin(\theta+\pi/4)\beta$ |
| 1 | 0 | 1 | 0 | 1 | 0 | $\alpha + \sqrt{2}\cos(\theta+3\pi/4)\beta$ | $-3\alpha + \sqrt{2}\sin(\theta+3\pi/4)\beta$ |
| 0 | 0 | 1 | 1 | 1 | 0 | $\alpha + \sqrt{2}\cos(\theta+7\pi/4)\beta$ | $-3\alpha + \sqrt{2}\sin(\theta+7\pi/4)\beta$ |
| 0 | 0 | 1 | 0 | 1 | 0 | $\alpha + \sqrt{2}\cos(\theta+5\pi/4)\beta$ | $-3\alpha + \sqrt{2}\sin(\theta+5\pi/4)\beta$ |
| 1 | 0 | 1 | 1 | 0 | 1 | $-3\alpha + \sqrt{2}\cos(\theta+\pi/4)\beta$ | $-3\alpha + \sqrt{2}\sin(\theta+\pi/4)\beta$ |
| 1 | 0 | 1 | 0 | 0 | 1 | $-3\alpha + \sqrt{2}\cos(\theta+3\pi/4)\beta$ | $-3\alpha + \sqrt{2}\sin(\theta+3\pi/4)\beta$ |
| 0 | 0 | 1 | 1 | 0 | 1 | $-3\alpha + \sqrt{2}\cos(\theta+7\pi/4)\beta$ | $-3\alpha + \sqrt{2}\sin(\theta+7\pi/4)\beta$ |
| 0 | 0 | 1 | 0 | 0 | 1 | $-3\alpha + \sqrt{2}\cos(\theta+5\pi/4)\beta$ | $-3\alpha + \sqrt{2}\sin(\theta+5\pi/4)\beta$ |
| 1 | 0 | 1 | 0 | 1 | 1 | $-\alpha + \sqrt{2}\cos(\theta+\pi/4)\beta$ | $-3\alpha + \sqrt{2}\sin(\theta+\pi/4)\beta$ |
| 1 | 0 | 1 | 1 | 1 | 1 | $-\alpha + \sqrt{2}\cos(\theta+3\pi/4)\beta$ | $-3\alpha + \sqrt{2}\sin(\theta+3\pi/4)\beta$ |
| 0 | 0 | 1 | 0 | 1 | 1 | $-\alpha + \sqrt{2}\cos(\theta+7\pi/4)\beta$ | $-3\alpha + \sqrt{2}\sin(\theta+7\pi/4)\beta$ |
| 0 | 0 | 1 | 1 | 1 | 1 | $-\alpha + \sqrt{2}\cos(\theta+5\pi/4)\beta$ | $-3\alpha + \sqrt{2}\sin(\theta+5\pi/4)\beta$ |

TABLE 4-continued

| | Modulator Input Bits | | | | | Modulation Symbols | |
|---|---|---|---|---|---|---|---|
| $s_5$ | $s_4$ | $s_3$ | $s_2$ | $s_1$ | $s_0$ | $m_I(k)$ | $m_Q(k)$ |
| 0 | 1 | 1 | 0 | 0 | 0 | $3\alpha + \sqrt{2}\cos(\theta + \pi/4)\beta$ | $-\alpha + \sqrt{2}\sin(\theta + \pi/4)\beta$ |
| 0 | 1 | 1 | 1 | 0 | 0 | $3\alpha + \sqrt{2}\cos(\theta + 3\pi/4)\beta$ | $-\alpha + \sqrt{2}\sin(\theta + 3\pi/4)\beta$ |
| 1 | 1 | 1 | 0 | 0 | 0 | $3\alpha + \sqrt{2}\cos(\theta + 7\pi/4)\beta$ | $-\alpha + \sqrt{2}\sin(\theta + 7\pi/4)\beta$ |
| 1 | 1 | 1 | 1 | 0 | 0 | $3\alpha + \sqrt{2}\cos(\theta + 5\pi/4)\beta$ | $-\alpha + \sqrt{2}\sin(\theta + 5\pi/4)\beta$ |
| 0 | 1 | 1 | 1 | 1 | 0 | $\alpha + \sqrt{2}\cos(\theta + \pi/4)\beta$ | $-\alpha + \sqrt{2}\sin(\theta + \pi/4)\beta$ |
| 0 | 1 | 1 | 0 | 1 | 0 | $\alpha + \sqrt{2}\cos(\theta + 3\pi/4)\beta$ | $-\alpha + \sqrt{2}\sin(\theta + 3\pi/4)\beta$ |
| 1 | 1 | 1 | 1 | 1 | 0 | $\alpha + \sqrt{2}\cos(\theta + 7\pi/4)\beta$ | $-\alpha + \sqrt{2}\sin(\theta + 7\pi/4)\beta$ |
| 1 | 1 | 1 | 0 | 1 | 0 | $\alpha + \sqrt{2}\cos(\theta + 5\pi/4)\beta$ | $-\alpha + \sqrt{2}\sin(\theta + 5\pi/4)\beta$ |
| 0 | 1 | 1 | 1 | 0 | 1 | $-3\alpha + \sqrt{2}\cos(\theta + \pi/4)\beta$ | $-\alpha + \sqrt{2}\sin(\theta + \pi/4)\beta$ |
| 0 | 1 | 1 | 0 | 0 | 1 | $-3\alpha + \sqrt{2}\cos(\theta + 3\pi/4)\beta$ | $-\alpha + \sqrt{2}\sin(\theta + 3\pi/4)\beta$ |
| 1 | 1 | 1 | 1 | 0 | 1 | $-3\alpha + \sqrt{2}\cos(\theta + 7\pi/4)\beta$ | $-\alpha + \sqrt{2}\sin(\theta + 7\pi/4)\beta$ |
| 1 | 1 | 1 | 0 | 0 | 1 | $-3\alpha + \sqrt{2}\cos(\theta + 5\pi/4)\beta$ | $-\alpha + \sqrt{2}\sin(\theta + 5\pi/4)\beta$ |
| 0 | 1 | 1 | 1 | 1 | 1 | $-\alpha + \sqrt{2}\cos(\theta + \pi/4)\beta$ | $-\alpha + \sqrt{2}\sin(\theta + \pi/4)\beta$ |
| 0 | 1 | 1 | 1 | 1 | 1 | $-\alpha + \sqrt{2}\cos(\theta + 3\pi/4)\beta$ | $-\alpha + \sqrt{2}\sin(\theta + 3\pi/4)\beta$ |
| 1 | 1 | 1 | 0 | 1 | 1 | $-\alpha + \sqrt{2}\cos(\theta + 7\pi/4)\beta$ | $-\alpha + \sqrt{2}\sin(\theta + 7\pi/4)\beta$ |
| 1 | 1 | 1 | 1 | 1 | 1 | $-\alpha + \sqrt{2}\cos(\theta + 5\pi/4)\beta$ | $-\alpha + \sqrt{2}\sin(\theta + 5\pi/4)\beta$ |

Referring to Table 4, each column defines the symbol position for each six (6) bits, s5, s4, s3, s2, s1, s0. Here, the position of each symbol is given in a two-dimensional signal space ($m_I$, $m_Q$). This means that each symbol can be represented by $S(t)=\lfloor M_I \cos(2\pi f_0 t+\phi_0)+M_Q*\sin(2\pi f_0 t+\phi_0)\rfloor\phi(t)$. Simply put, the complex modulation symbol $S=(m_I, m_Q)$ for each [s5, s4, s3, s2, s1, s0] is specified in $S(t)=\lfloor M_I \cos(2\pi f_0 t+\phi_0)+M_Q*\sin(2\pi f_0 t+\phi_0)\rfloor\phi(t)$.

Here, $w_0$ denotes carrier frequency, $\pi_0$ denotes an initial phase of the carrier, and $\phi(t)$ denotes the symbol shaping or pulse shaping wave. Here, $\cos(2\pi f_0 t+\phi_0)$ and $\sin(2\pi f_0 t+\phi_0)$ denote the carrier signal with initial phase $\phi_0$ and carrier frequency $f_0$. Moreover, $\phi(t)$ denotes the pulse-shaping, the shape of a transmit symbol.

In the above definition of S(t), except the $m_I$ and $m_Q$ value, other parameters can usually either be shared between the transmitter and the receiver or be detected by the receiver itself. For correctly demodulating S(t), it is necessary to define and share the possible value information of $m_I$ and $m_Q$.

The possible value of $m_I(k)$ and $m_Q(k)$, which denote the $m_I$ and $m_Q$ value for the kth symbol, are given in Table 1. It shows for representing each group inputs bits s5, s4, s3, s2, s1, s0 the symbol shall be modulated by corresponding parameters shown in the table.

With respect to the definitions of $m_I$ and $m_Q$ in Table 1-4, in addition to the contents, the show that the rotation angle θ also needs to be shared along with those tables between transmitter and receiver. Table 5 can be used to address this problem regarding how the receiver and transmitter share the rotation angle information.

To this end, Table 5 can be used which defines and/or maps four (4) bits to a rotation angle. If this table is known by the receiver beforehand, then the transmitter only needs to send four (4) bits to receiver to indicate to the receiver the initial rotation angle for demodulating next rotated layered modulated symbols. This table is an example of quantizing the rotation angle θ with four (4) bits and uniform quantization. It is possible to quantize the rotation angle θ with other number of bits and different quantization rule for different accuracy.

More specifically, this table is either shared beforehand by the transmitter and receiver (e.g., access network and access terminal), downloaded to the receiver (e.g., access terminal) over the air, or only used by the transmitter (e.g., access network) when the hierarchical modulation is enabled. The default rotation word for hierarchical modulation is 0000, which corresponds to 0.0.

Further, this table can be used by the receiver for demodulating the rotated layered modulation. Compared with the regular or un-rotated layered modulation, the initial rotation angle is essentially zero (0). This information of initial rotation angle of zero (0) indicates an implicit consensus between the transmitter and the receiver. However, for rotated layered modulation, this information may not be implicitly shared between the transmitter and/or the receiver. In other words, a mechanism to send or indicate this initial rotation angle to the receiver is necessary.

TABLE 5

| | Bits for Angle | Mapped Rotation Angle (degree) | |
|---|---|---|---|
| Index | Rotating | Unit: degree | Unit: radian |
| 0 | 0000 | 0.0 | 0.0 |
| 1 | 0001 | 2.81 | 0.04909 |
| 2 | 0011 | 5.63 | 0.09817 |
| 3 | 0010 | 8.44 | 0.1473 |
| 4 | 0110 | 11.25 | 0.1963 |
| 5 | 0111 | 14.06 | 0.2454 |
| 6 | 0101 | 16.88 | 0.2945 |
| 7 | 0100 | 19.69 | 0.3436 |
| 8 | 1100 | 22.50 | 0.3927 |
| 9 | 1101 | 25.31 | 0.4418 |
| 10 | 1111 | 28.13 | 0.4909 |
| 11 | 1110 | 30.94 | 0.5400 |
| 12 | 1010 | 33.75 | 0.5890 |
| 13 | 1011 | 36.56 | 0.6381 |
| 14 | 1001 | 39.38 | 0.6872 |
| 15 | 1000 | 42.19 | 0.7363 |

In a further application of the layered or superposition modulation for BCMCS, layered modulation can be a superposition of any two modulation schemes. In BCMCS, a QPSK enhancement layer is superposed on a base QPSK or 16-QAM layer to obtain the resultant signal constellation. The energy ratio r is the power ratio between the base layer and the enhancement. Furthermore, the enhancement layer is rotated by the angle θ in counter-clockwise direction.

Figure 20:
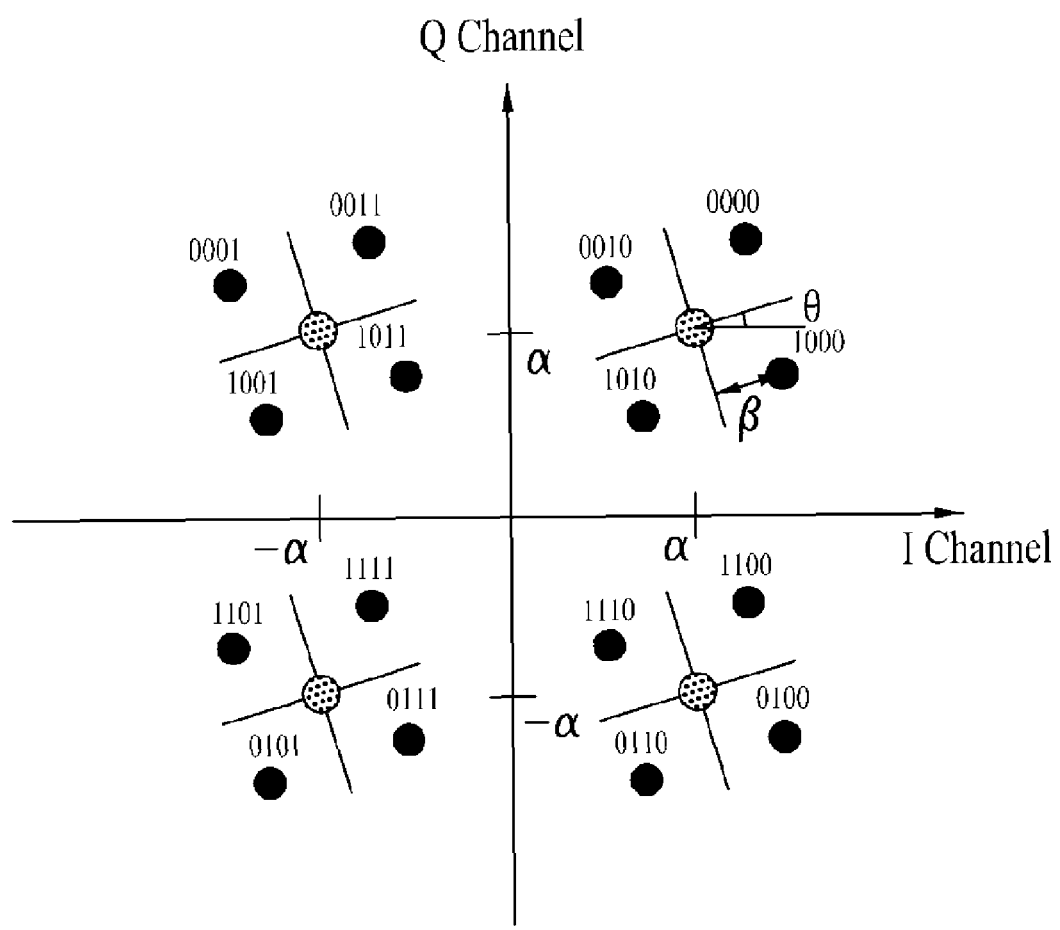
FIG. 20 is an exemplary diagram illustrating signal constellation for layered modulation with QPSK base layer and QPSK enhancement layer in accordance with one embodiment.

FIG. 20 is an exemplary diagram illustrating signal constellation for layered modulation with QPSK base layer and QPSK enhancement layer. Referring to FIG. 20, each modulation symbol contains four (4) bits, namely, s3, s2, s1, s0. Here, there are two (2) MSBs which are s3 and s1, and two (2) LSBs which are s2 and s0. The two (2) MSBs are from the base layer and the two LSBs come from the enhancement layer Given energy ratio r between the base layer and enhancement layer, $$\alpha = \sqrt{\frac{r}{2(1+r)}} \text{ and } \beta = \sqrt{\frac{1}{2(1+r)}}$$

can be defined such that $2(\alpha^2+\beta^2)=1$. Here, $\alpha$ denotes the amplitude of the base layer, and $\beta$ denotes the amplitude of enhancement layer. Moreover, $2(\alpha^2+\beta^2)=1$ is a constraint which is also referred to as power constraint and more accurately referred to as normalization.

Table 6 illustrates a layered modulation table with QPSK base layer and QPSK enhancement layer.

TABLE 6

| Modulator Input Bits | | | | Modulation Symbols | |
|---|---|---|---|---|---|
| $s_3$ | $s_2$ | $s_1$ | $s_0$ | $m_I(k)$ | $m_Q(k)$ |
| 0 | 0 | 0 | 0 | $\alpha + \sqrt{2}\cos(\theta + \pi/4)\beta$ | $\alpha + \sqrt{2}\sin(\theta + \pi/4)\beta$ |
| 0 | 0 | 1 | 0 | $\alpha + \sqrt{2}\cos(\theta + 3\pi/4)\beta$ | $\alpha + \sqrt{2}\sin(\theta + 3\pi/4)\beta$ |
| 1 | 0 | 0 | 0 | $\alpha + \sqrt{2}\cos(\theta + 7\pi/4)\beta$ | $\alpha + \sqrt{2}\sin(\theta + 7\pi/4)\beta$ |
| 1 | 0 | 1 | 0 | $\alpha + \sqrt{2}\cos(\theta + 5\pi/4)\beta$ | $\alpha + \sqrt{2}\sin(\theta + 5\pi/4)\beta$ |
| 0 | 0 | 0 | 1 | $-\alpha + \sqrt{2}\cos(\theta + \pi/4)\beta$ | $\alpha + \sqrt{2}\sin(\theta + \pi/4)\beta$ |
| 0 | 0 | 1 | 1 | $-\alpha + \sqrt{2}\cos(\theta + 3\pi/4)\beta$ | $\alpha + \sqrt{2}\sin(\theta + 3\pi/4)\beta$ |
| 1 | 0 | 1 | 1 | $-\alpha + \sqrt{2}\cos(\theta + 7\pi/4)\beta$ | $\alpha + \sqrt{2}\sin(\theta + 7\pi/4)\beta$ |
| 1 | 0 | 0 | 1 | $-\alpha + \sqrt{2}\cos(\theta + 5\pi/4)\beta$ | $\alpha + \sqrt{2}\sin(\theta + 5\pi/4)\beta$ |
| 1 | 1 | 0 | 0 | $\alpha + \sqrt{2}\cos(\theta + \pi/4)\beta$ | $-\alpha + \sqrt{2}\sin(\theta + \pi/4)\beta$ |
| 1 | 1 | 1 | 0 | $\alpha + \sqrt{2}\cos(\theta + 3\pi/4)\beta$ | $-\alpha + \sqrt{2}\sin(\theta + 3\pi/4)\beta$ |
| 0 | 1 | 0 | 0 | $\alpha + \sqrt{2}\cos(\theta + 7\pi/4)\beta$ | $-\alpha + \sqrt{2}\sin(\theta + 7\pi/4)\beta$ |
| 0 | 1 | 1 | 0 | $\alpha + \sqrt{2}\cos(\theta + 5\pi/4)\beta$ | $-\alpha + \sqrt{2}\sin(\theta + 5\pi/4)\beta$ |
| 1 | 1 | 1 | 1 | $-\alpha + \sqrt{2}\cos(\theta + \pi/4)\beta$ | $-\alpha + \sqrt{2}\sin(\theta + \pi/4)\beta$ |
| 1 | 1 | 0 | 1 | $-\alpha + \sqrt{2}\cos(\theta + 3\pi/4)\beta$ | $-\alpha + \sqrt{2}\sin(\theta + 3\pi/4)\beta$ |
| 0 | 1 | 1 | 1 | $-\alpha + \sqrt{2}\cos(\theta + 7\pi/4)\beta$ | $-\alpha + \sqrt{2}\sin(\theta + 7\pi/4)\beta$ |
| 0 | 1 | 0 | 1 | $-\alpha + \sqrt{2}\cos(\theta + 5\pi/4)\beta$ | $-\alpha + \sqrt{2}\sin(\theta + 5\pi/4)\beta$ |

Referring to Table 6, each column defines the symbol position for each four (4) bits, s3, s2, s1, s0. Here, the position of each symbol is given in a two-dimensional signal space ($m_I$, $m_Q$). This means that each symbol can be represented by $S(t)=[M_I\cos(2\pi f_0 t+\phi_0)+M_Q*\sin(2\pi f_0 t+\phi_0)]\phi(t)$. Simply put, the complex modulation symbol $S=(m_I, m_Q)$ for each [s3, s2, s1, s0] is specified in $S(t)=[M_I\cos(2\pi f_0 t+\phi_0)+M_Q*\sin(2\pi f_0 t+\phi_0)]\phi(t)$.

Here, $\cos(2\pi f_0 t+\phi_0)$ and $\sin(2\pi f_0 t+\phi_0)$ denote the carrier signal with initial phase $\phi_0$ and carrier frequency $f_0$. Moreover, $\phi(t)$ denotes the pulse-shaping, the shape of a transmit symbol.

In the above definition of S(t), except the $m_I$ and $m_Q$ value, other parameters can usually either be shared between the transmitter and the receiver or be detected by the receiver itself. For correctly demodulating S(t), it is necessary to define and share the possible value information of $m_I$ and $m_Q$.

The possible value of $m_I(k)$ and $m_Q(k)$, which denote the $m_I$ and $m_Q$ value for the kth symbol, are given in Table 1. It shows for representing each group inputs bits s3, s2, s1, s0 the symbol shall be modulated by corresponding parameters shown in the table.

Figure 21:
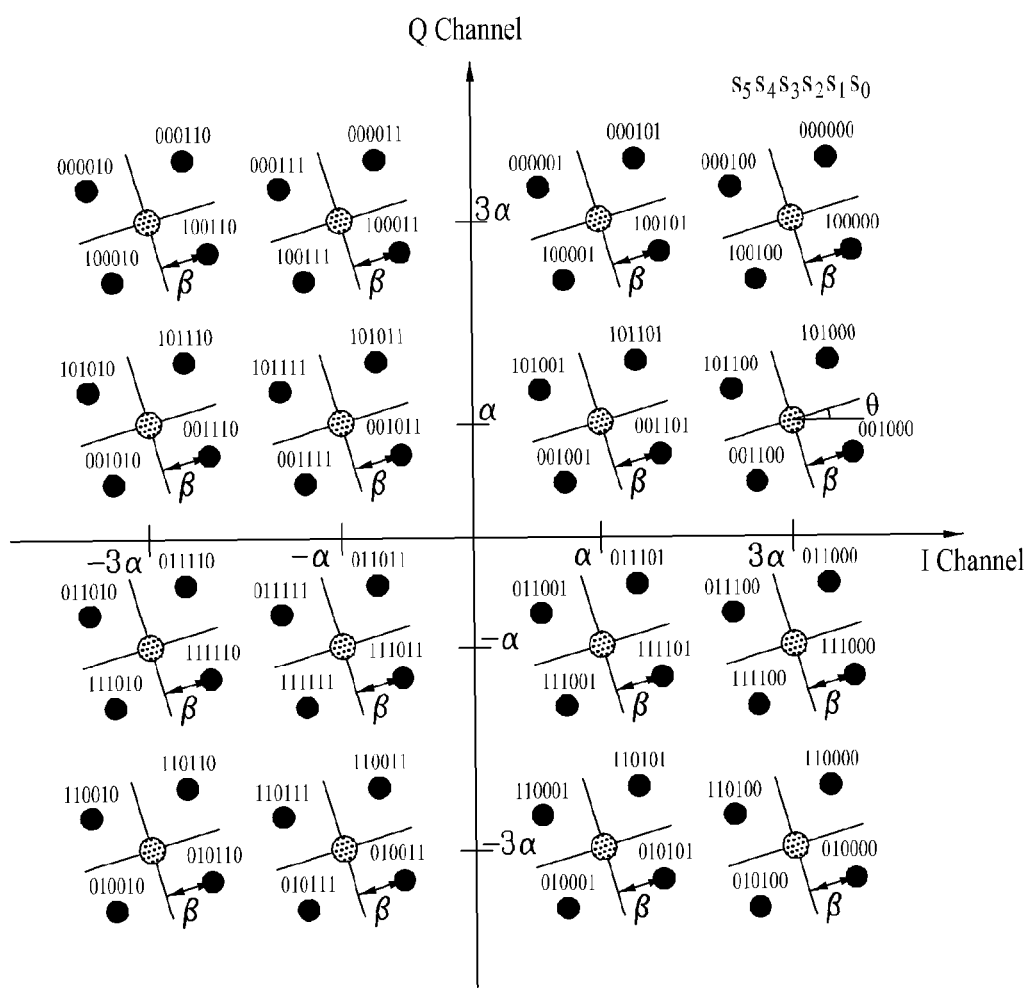
FIG. 21 is an exemplary diagram illustrating the signal constellation of the layered modulator with respect to 16QAM/QPSK hierarchical modulation in accordance with one embodiment.

FIG. 21 is an exemplary diagram illustrating the signal constellation of the layered modulator with respect to 16QAM/QPSK hierarchical modulation. Referring to another 16QAM/QPSK hierarchical modulation, which means 16QAM base layer and QPSK enhancement layer, each modulation symbol contains six (6) bits—s5, s4, s3, s2, s1, s0. The four (4) MSBs, s4, s3, s1 and s0, come from the base layer, and the two (2) LSBs, s5 and s2, come from the enhancement layer.

Given energy ratio r between the base layer and enhancement layer, $$\alpha = \sqrt{\frac{r}{2(1+r)}} \text{ and } \beta = \sqrt{\frac{1}{2(1+r)}}$$

can be defined such that $2(\alpha^2+\beta^2)=1$. Here, $\alpha$ denotes the amplitude of the base layer, and $\beta$ denotes the amplitude of enhancement layer. Moreover, $2(\alpha^2+\beta^2)=1$ is a constraint which is also referred to as power constraint and more accurately referred to as normalization.

Table 7 illustrates a layered modulation table with 16QAM base layer and QPSK enhancement layer.

TABLE 7

| Modulator Input Bits | | | | | | Modulation Symbols | |
|---|---|---|---|---|---|---|---|
| $s_5$ | $s_4$ | $s_3$ | $s_2$ | $s_1$ | $s_0$ | $m_I(k)$ | $m_Q(k)$ |
| 0 | 0 | 0 | 0 | 0 | 0 | $3\alpha + \sqrt{2}\cos(\theta + \pi/4)\beta$ | $3\alpha + \sqrt{2}\sin(\theta + \pi/4)\beta$ |
| 0 | 0 | 0 | 1 | 0 | 0 | $3\alpha + \sqrt{2}\cos(\theta + 3\pi/4)\beta$ | $3\alpha + \sqrt{2}\sin(\theta + 3\pi/4)\beta$ |
| 1 | 0 | 0 | 0 | 0 | 0 | $3\alpha + \sqrt{2}\cos(\theta + 7\pi/4)\beta$ | $3\alpha + \sqrt{2}\sin(\theta + 7\pi/4)\beta$ |
| 1 | 0 | 0 | 1 | 0 | 0 | $3\alpha + \sqrt{2}\cos(\theta + 5\pi/4)\beta$ | $3\alpha + \sqrt{2}\sin(\theta + 5\pi/4)\beta$ |
| 0 | 0 | 0 | 1 | 0 | 1 | $\alpha + \sqrt{2}\cos(\theta + \pi/4)\beta$ | $3\alpha + \sqrt{2}\sin(\theta + \pi/4)\beta$ |
| 0 | 0 | 0 | 0 | 0 | 1 | $\alpha + \sqrt{2}\cos(\theta + 3\pi/4)\beta$ | $3\alpha + \sqrt{2}\sin(\theta + 3\pi/4)\beta$ |
| 1 | 0 | 0 | 1 | 0 | 1 | $\alpha + \sqrt{2}\cos(\theta + 7\pi/4)\beta$ | $3\alpha + \sqrt{2}\sin(\theta + 7\pi/4)\beta$ |
| 1 | 0 | 0 | 0 | 0 | 1 | $\alpha + \sqrt{2}\cos(\theta + 5\pi/4)\beta$ | $3\alpha + \sqrt{2}\sin(\theta + 5\pi/4)\beta$ |
| 0 | 0 | 0 | 1 | 1 | 0 | $-3\alpha + \sqrt{2}\cos(\theta + \pi/4)\beta$ | $3\alpha + \sqrt{2}\sin(\theta + \pi/4)\beta$ |
| 0 | 0 | 0 | 0 | 1 | 0 | $-3\alpha + \sqrt{2}\cos(\theta + 3\pi/4)\beta$ | $3\alpha + \sqrt{2}\sin(\theta + 3\pi/4)\beta$ |
| 1 | 0 | 0 | 1 | 1 | 0 | $-3\alpha + \sqrt{2}\cos(\theta + 7\pi/4)\beta$ | $3\alpha + \sqrt{2}\sin(\theta + 7\pi/4)\beta$ |
| 1 | 0 | 0 | 0 | 1 | 0 | $-3\alpha + \sqrt{2}\cos(\theta + 5\pi/4)\beta$ | $3\alpha + \sqrt{2}\sin(\theta + 5\pi/4)\beta$ |
| 0 | 0 | 0 | 0 | 1 | 1 | $-\alpha + \sqrt{2}\cos(\theta + \pi/4)\beta$ | $3\alpha + \sqrt{2}\sin(\theta + \pi/4)\beta$ |
| 0 | 0 | 0 | 1 | 1 | 1 | $-\alpha + \sqrt{2}\cos(\theta + 3\pi/4)\beta$ | $3\alpha + \sqrt{2}\sin(\theta + 3\pi/4)\beta$ |
| 1 | 0 | 0 | 0 | 1 | 1 | $-\alpha + \sqrt{2}\cos(\theta + 7\pi/4)\beta$ | $3\alpha + \sqrt{2}\sin(\theta + 7\pi/4)\beta$ |
| 1 | 0 | 0 | 1 | 1 | 1 | $-\alpha + \sqrt{2}\cos(\theta + 5\pi/4)\beta$ | $3\alpha + \sqrt{2}\sin(\theta + 5\pi/4)\beta$ |
| 1 | 0 | 1 | 0 | 0 | 0 | $3\alpha + \sqrt{2}\cos(\theta + \pi/4)\beta$ | $\alpha + \sqrt{2}\sin(\theta + \pi/4)\beta$ |
| 1 | 0 | 1 | 1 | 0 | 0 | $3\alpha + \sqrt{2}\cos(\theta + 3\pi/4)\beta$ | $\alpha + \sqrt{2}\sin(\theta + 3\pi/4)\beta$ |
| 0 | 0 | 1 | 0 | 0 | 0 | $3\alpha + \sqrt{2}\cos(\theta + 7\pi/4)\beta$ | $\alpha + \sqrt{2}\sin(\theta + 7\pi/4)\beta$ |

TABLE 7-continued

| | Modulator Input Bits | | | | | Modulation Symbols | |
|---|---|---|---|---|---|---|---|
| $s_5$ | $s_4$ | $s_3$ | $s_2$ | $s_1$ | $s_0$ | $m_I(k)$ | $m_Q(k)$ |
| 0 | 0 | 1 | 1 | 0 | 0 | $3\alpha + \sqrt{2}\cos(\theta + 5\pi/4)\beta$ | $\alpha + \sqrt{2}\sin(\theta + 5\pi/4)\beta$ |
| 1 | 0 | 1 | 1 | 0 | 1 | $\alpha + \sqrt{2}\cos(\theta + \pi/4)\beta$ | $\alpha + \sqrt{2}\sin(\theta + \pi/4)\beta$ |
| 1 | 0 | 1 | 0 | 0 | 1 | $\alpha + \sqrt{2}\cos(\theta + 3\pi/4)\beta$ | $\alpha + \sqrt{2}\sin(\theta + 3\pi/4)\beta$ |
| 0 | 0 | 1 | 1 | 0 | 1 | $\alpha + \sqrt{2}\cos(\theta + 7\pi/4)\beta$ | $\alpha + \sqrt{2}\sin(\theta + 7\pi/4)\beta$ |
| 0 | 0 | 1 | 0 | 0 | 1 | $\alpha + \sqrt{2}\cos(\theta + 5\pi/4)\beta$ | $\alpha + \sqrt{2}\sin(\theta + 5\pi/4)\beta$ |
| 1 | 0 | 1 | 1 | 1 | 0 | $-3\alpha + \sqrt{2}\cos(\theta + \pi/4)\beta$ | $\alpha + \sqrt{2}\sin(\theta + \pi/4)\beta$ |
| 1 | 0 | 1 | 0 | 1 | 0 | $-3\alpha + \sqrt{2}\cos(\theta + 3\pi/4)\beta$ | $\alpha + \sqrt{2}\sin(\theta + 3\pi/4)\beta$ |
| 1 | 0 | 1 | 1 | 1 | 0 | $-3\alpha + \sqrt{2}\cos(\theta + 7\pi/4)\beta$ | $\alpha + \sqrt{2}\sin(\theta + 7\pi/4)\beta$ |
| 0 | 0 | 1 | 0 | 1 | 0 | $-3\alpha + \sqrt{2}\cos(\theta + 5\pi/4)\beta$ | $\alpha + \sqrt{2}\sin(\theta + 5\pi/4)\beta$ |
| 1 | 0 | 1 | 0 | 1 | 1 | $-\alpha + \sqrt{2}\cos(\theta + \pi/4)\beta$ | $\alpha + \sqrt{2}\sin(\theta + \pi/4)\beta$ |
| 1 | 0 | 1 | 1 | 1 | 1 | $-\alpha + \sqrt{2}\cos(\theta + 3\pi/4)\beta$ | $\alpha + \sqrt{2}\sin(\theta + 3\pi/4)\beta$ |
| 0 | 0 | 1 | 0 | 1 | 1 | $-\alpha + \sqrt{2}\cos(\theta + 7\pi/4)\beta$ | $\alpha + \sqrt{2}\sin(\theta + 7\pi/4)\beta$ |
| 0 | 0 | 1 | 1 | 1 | 1 | $-\alpha + \sqrt{2}\cos(\theta + 5\pi/4)\beta$ | $\alpha + \sqrt{2}\sin(\theta + 5\pi/4)\beta$ |
| 1 | 1 | 0 | 0 | 0 | 0 | $3\alpha + \sqrt{2}\cos(\theta + \pi/4)\beta$ | $-3\alpha + \sqrt{2}\sin(\theta + \pi/4)\beta$ |
| 1 | 1 | 0 | 1 | 0 | 0 | $3\alpha + \sqrt{2}\cos(\theta + 3\pi/4)\beta$ | $-3\alpha + \sqrt{2}\sin(\theta + 3\pi/4)\beta$ |
| 0 | 1 | 0 | 0 | 0 | 0 | $3\alpha + \sqrt{2}\cos(\theta + 7\pi/4)\beta$ | $-3\alpha + \sqrt{2}\sin(\theta + 7\pi/4)\beta$ |
| 0 | 1 | 0 | 1 | 0 | 0 | $3\alpha + \sqrt{2}\cos(\theta + 5\pi/4)\beta$ | $-3\alpha + \sqrt{2}\sin(\theta + 5\pi/4)\beta$ |
| 1 | 1 | 0 | 1 | 0 | 1 | $\alpha + \sqrt{2}\cos(\theta + \pi/4)\beta$ | $-3\alpha + \sqrt{2}\sin(\theta + \pi/4)\beta$ |
| 1 | 1 | 0 | 0 | 0 | 1 | $\alpha + \sqrt{2}\cos(\theta + 3\pi/4)\beta$ | $-3\alpha + \sqrt{2}\sin(\theta + 3\pi/4)\beta$ |
| 0 | 1 | 0 | 1 | 0 | 1 | $\alpha + \sqrt{2}\cos(\theta + 7\pi/4)\beta$ | $-3\alpha + \sqrt{2}\sin(\theta + 7\pi/4)\beta$ |
| 0 | 1 | 0 | 0 | 0 | 1 | $\alpha + \sqrt{2}\cos(\theta + 5\pi/4)\beta$ | $-3\alpha + \sqrt{2}\sin(\theta + 5\pi/4)\beta$ |
| 1 | 1 | 0 | 1 | 1 | 0 | $-3\alpha + \sqrt{2}\cos(\theta + \pi/4)\beta$ | $-3\alpha + \sqrt{2}\sin(\theta + \pi/4)\beta$ |
| 1 | 1 | 0 | 0 | 1 | 0 | $-3\alpha + \sqrt{2}\cos(\theta + 3\pi/4)\beta$ | $-3\alpha + \sqrt{2}\sin(\theta + 3\pi/4)\beta$ |
| 0 | 1 | 0 | 1 | 1 | 0 | $-3\alpha + \sqrt{2}\cos(\theta + 7\pi/4)\beta$ | $-3\alpha + \sqrt{2}\sin(\theta + 7\pi/4)\beta$ |
| 0 | 1 | 0 | 0 | 1 | 0 | $-3\alpha + \sqrt{2}\cos(\theta + 5\pi/4)\beta$ | $-3\alpha + \sqrt{2}\sin(\theta + 5\pi/4)\beta$ |
| 1 | 1 | 0 | 0 | 1 | 1 | $-\alpha + \sqrt{2}\cos(\theta + \pi/4)\beta$ | $-\alpha + \sqrt{2}\sin(\theta + \pi/4)\beta$ |
| 1 | 1 | 0 | 1 | 1 | 1 | $-\alpha + \sqrt{2}\cos(\theta + 3\pi/4)\beta$ | $-\alpha + \sqrt{2}\sin(\theta + 3\pi/4)\beta$ |
| 0 | 1 | 0 | 0 | 1 | 1 | $-\alpha + \sqrt{2}\cos(\theta + 7\pi/4)\beta$ | $-\alpha + \sqrt{2}\sin(\theta + 7\pi/4)\beta$ |
| 0 | 1 | 0 | 1 | 1 | 1 | $-\alpha + \sqrt{2}\cos(\theta + 5\pi/4)\beta$ | $-\alpha + \sqrt{2}\sin(\theta + 5\pi/4)\beta$ |
| 0 | 1 | 1 | 0 | 0 | 0 | $3\alpha + \sqrt{2}\cos(\theta + \pi/4)\beta$ | $-\alpha + \sqrt{2}\sin(\theta + \pi/4)\beta$ |
| 0 | 1 | 1 | 1 | 0 | 0 | $3\alpha + \sqrt{2}\cos(\theta + 3\pi/4)\beta$ | $-\alpha + \sqrt{2}\sin(\theta + 3\pi/4)\beta$ |
| 1 | 1 | 1 | 0 | 0 | 0 | $3\alpha + \sqrt{2}\cos(\theta + 7\pi/4)\beta$ | $-\alpha + \sqrt{2}\sin(\theta + 7\pi/4)\beta$ |
| 1 | 1 | 1 | 1 | 0 | 0 | $3\alpha + \sqrt{2}\cos(\theta + 5\pi/4)\beta$ | $-\alpha + \sqrt{2}\sin(\theta + 5\pi/4)\beta$ |
| 0 | 1 | 1 | 0 | 0 | 1 | $\alpha + \sqrt{2}\cos(\theta + \pi/4)\beta$ | $-\alpha + \sqrt{2}\sin(\theta + \pi/4)\beta$ |
| 0 | 1 | 1 | 0 | 0 | 1 | $\alpha + \sqrt{2}\cos(\theta + 3\pi/4)\beta$ | $-\alpha + \sqrt{2}\sin(\theta + 3\pi/4)\beta$ |
| 1 | 1 | 1 | 1 | 0 | 1 | $\alpha + \sqrt{2}\cos(\theta + 7\pi/4)\beta$ | $-\alpha + \sqrt{2}\sin(\theta + 7\pi/4)\beta$ |
| 1 | 1 | 1 | 0 | 0 | 1 | $\alpha + \sqrt{2}\cos(\theta + 5\pi/4)\beta$ | $-\alpha + \sqrt{2}\sin(\theta + 5\pi/4)\beta$ |
| 0 | 1 | 1 | 1 | 1 | 0 | $-3\alpha + \sqrt{2}\cos(\theta + \pi/4)\beta$ | $-\alpha + \sqrt{2}\sin(\theta + \pi/4)\beta$ |
| 0 | 1 | 1 | 0 | 1 | 0 | $-3\alpha + \sqrt{2}\cos(\theta + 3\pi/4)\beta$ | $-\alpha + \sqrt{2}\sin(\theta + 3\pi/4)\beta$ |
| 1 | 1 | 1 | 1 | 1 | 0 | $-3\alpha + \sqrt{2}\cos(\theta + 7\pi/4)\beta$ | $-\alpha + \sqrt{2}\sin(\theta + 7\pi/4)\beta$ |
| 1 | 1 | 1 | 0 | 1 | 0 | $-3\alpha + \sqrt{2}\cos(\theta + 5\pi/4)\beta$ | $-\alpha + \sqrt{2}\sin(\theta + 5\pi/4)\beta$ |
| 0 | 1 | 1 | 0 | 1 | 1 | $-\alpha + \sqrt{2}\cos(\theta + \pi/4)\beta$ | $-\alpha + \sqrt{2}\sin(\theta + \pi/4)\beta$ |
| 0 | 1 | 1 | 1 | 1 | 1 | $-\alpha + \sqrt{2}\cos(\theta + 3\pi/4)\beta$ | $-\alpha + \sqrt{2}\sin(\theta + 3\pi/4)\beta$ |
| 1 | 1 | 1 | 0 | 1 | 1 | $-\alpha + \sqrt{2}\cos(\theta + 7\pi/4)\beta$ | $-\alpha + \sqrt{2}\sin(\theta + 7\pi/4)\beta$ |
| 1 | 1 | 1 | 1 | 1 | 1 | $-\alpha + \sqrt{2}\cos(\theta + 5\pi/4)\beta$ | $-\alpha + \sqrt{2}\sin(\theta + 5\pi/4)\beta$ |

Referring to Table 4, each column defines the symbol position for each six (6) bits, s5, s4, s3, s2, s1, s0. Here, the position of each symbol is given in a two-dimensional signal space ($m_I$, $m_Q$). This means that each symbol can be represented by $S(t)=\lfloor M_I \cos(2\pi f_0 t+\phi_0)+M_Q*\sin(2\pi f_0 t+\phi_0)\rfloor\phi(t)$. Simply put, the complex modulation symbol $S=(m_I, m_Q)$ for each [s5, s4, s3, s2, s1, s0] is specified in $S(t)=\lfloor M_I\cos(2\pi f_0 t+\phi_0)+M_Q*\sin(2\pi f_0 t+\phi_0)\rfloor\phi(t)$.

Here, $w_0$ denotes carrier frequency, $\pi_0$ denotes an initial phase of the carrier, and $\phi(t)$ denotes the symbol shaping or pulse shaping wave. Here, $\cos(2\pi f_0 t+\phi_0)$ and $\sin(2\pi f_0 t+\phi_0)$ denote the carrier signal with initial phase $\phi_0$ and carrier frequency $f_0$. Moreover, $\phi(t)$ denotes the pulse-shaping, the shape of a transmit symbol.

In the above definition of S(t), except the $m_I$ and $m_Q$ value, other parameters can usually either be shared between the transmitter and the receiver or be detected by the receiver itself. For correctly demodulating S(t), it is necessary to define and share the possible value information of $m_I$ and $m_Q$.

The possible value of $m_I(k)$ and $m_Q(k)$, which denote the $m_I$ and $m_Q$ value for the kth symbol, are given in Table 1. It shows for representing each group inputs bits s5, s4, s3, s2, s1, s0 the symbol shall be modulated by corresponding parameters shown in the table.

Figure 22:
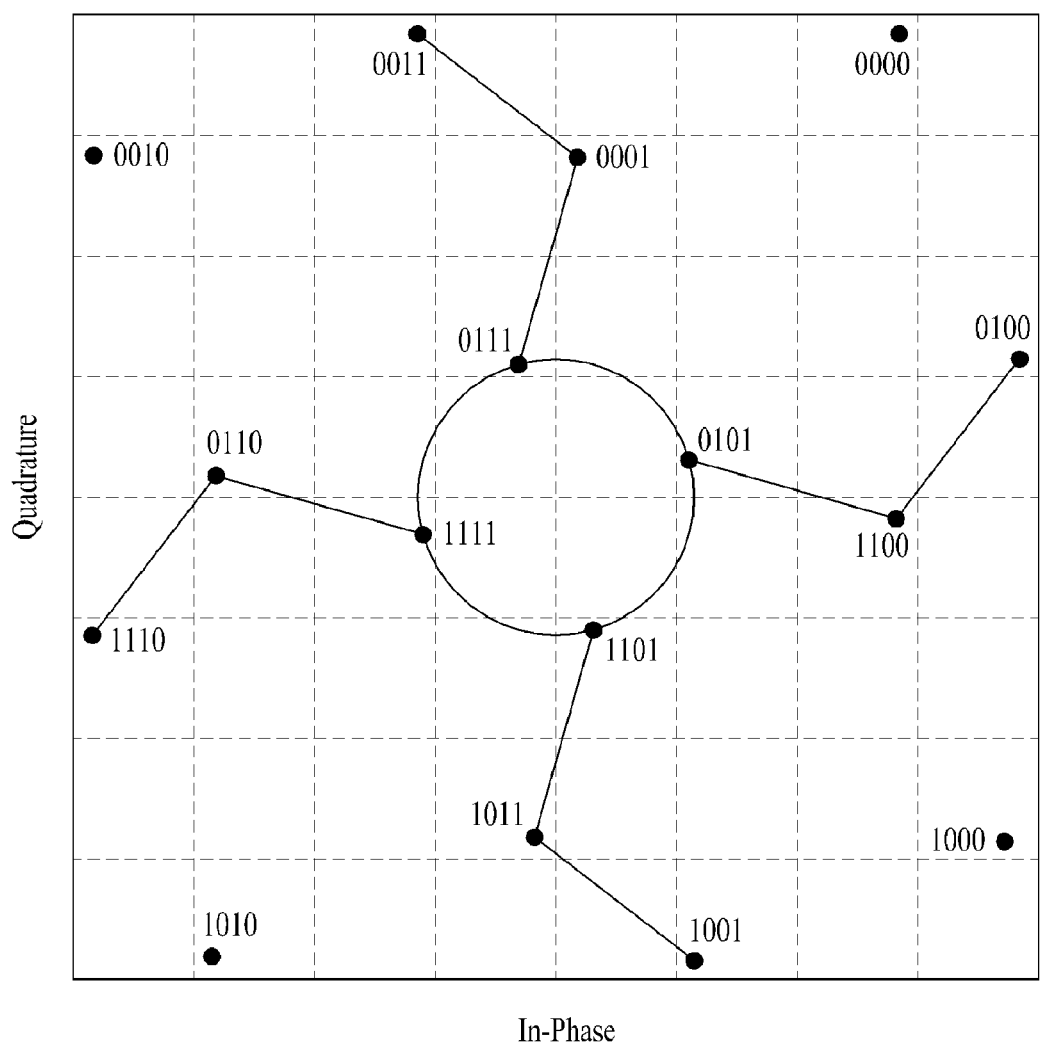
FIG. 22 is an exemplary diagram illustrating Gray mapping for rotated QPSK/QPSK hierarchical modulation in accordance with one embodiment.

However, the Euclid distance profile can change when the enhancement layer signal constellation is rotated and the power-splitting ratio is changed. This means the original Gray mapping in FIG. 21, for example, may not always be optimal. In this case, it may be necessary to perform bits-to-symbols remapping based on each Euclidean distance file instance. FIG. 22 is an exemplary diagram illustrating Gray mapping for rotated QPSK/QPSK hierarchical modulation.

The BER performance of a signal constellation can be dominated by symbol pairs with minimum Euclidean distance, especially when SNR is high. Therefore it is interesting to find optimal bits-to-symbol mapping rules, in which the codes for the closest two signals have minimum difference.

In general, Gray mapping in two-dimensional signals worked with channel coding can be accepted as optimal for minimizing BER for equally likely signals. Gray mapping for regular hierarchical signal constellations is shown in FIG. 21, where the codes for the closest two signals are different in only one bit. However, this kind of Euclidean distance profile may not be fixed in hierarchical modulation. An example of the minimum Euclidean distance of 16QAM/QPSK hierarchical modulation with different rotation angles is shown in FIG. 23.

Figure 23:
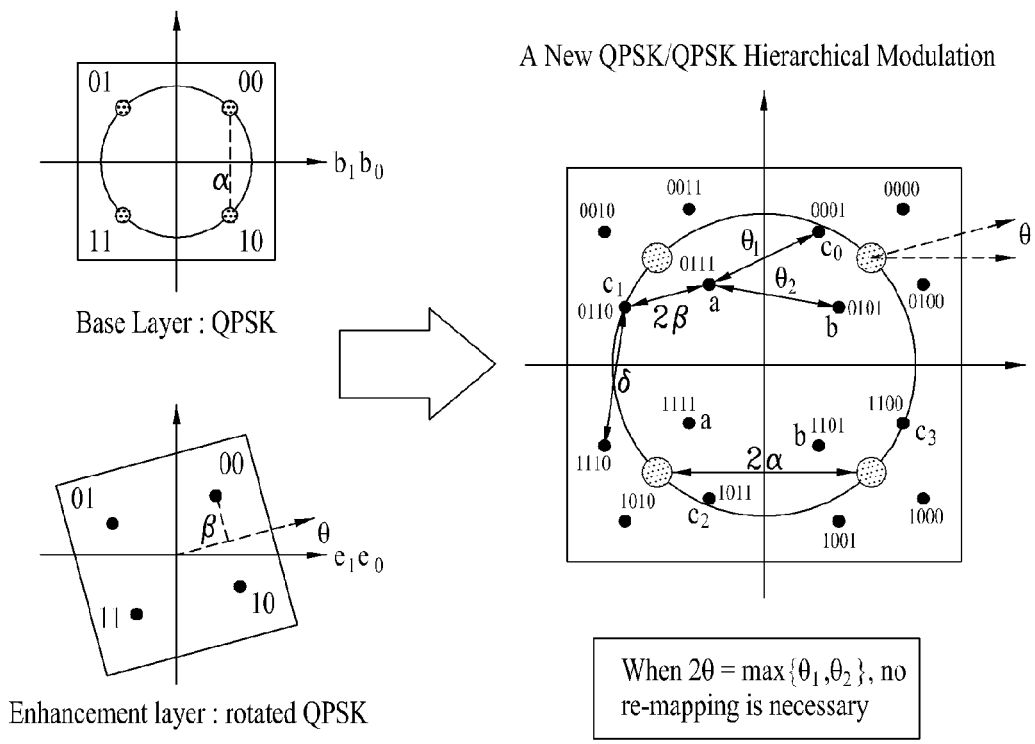
FIG. 23 is an exemplary diagram illustrating an enhanced QPSK/QPSK hierarchical modulation in accordance with one embodiment.

FIG. 23 is an exemplary diagram illustrating an enhanced QPSK/QPSK hierarchical modulation. Referring to FIG. 23, the base layered is modulated with QPSK and the enhancement layer is modulated with rotated QPSK. If the hierarchical modulation is applied, a new QPSK/QPSK hierarchical modulation can be attained as shown in this figure.

Figure 24:
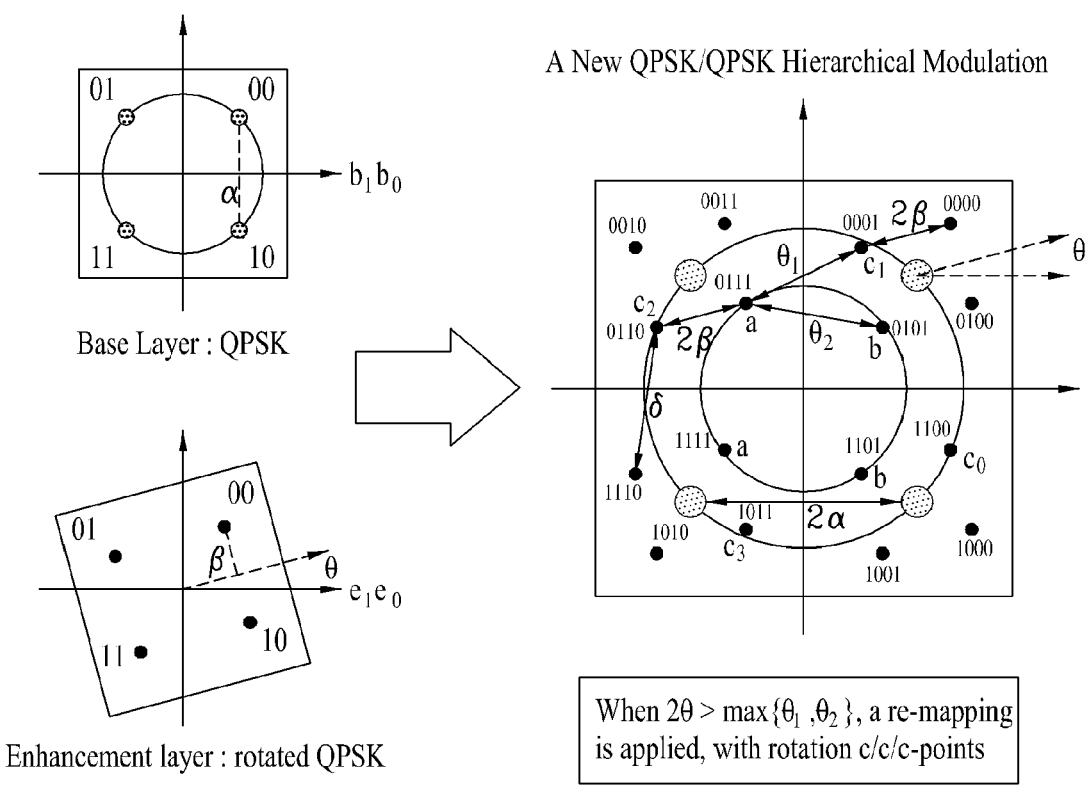
FIG. 24 is an exemplary diagram illustrating a new QPSK/QPSK hierarchical modulation in accordance with one embodiment.
Figure 25:
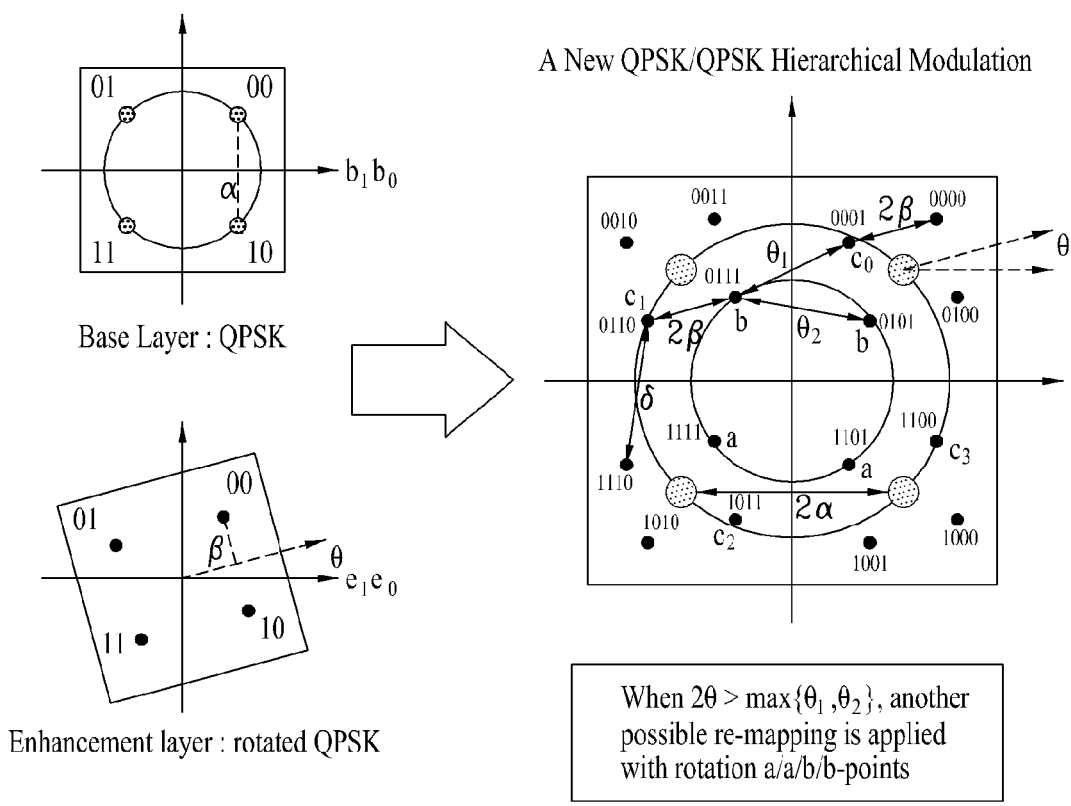
FIG. 25 is another exemplary diagram illustrating a new QPSK/QPSK hierarchical modulation in accordance with one embodiment.

Further, the inter-layer Euclidean distance may become shortest when the power splitting ratio increases in a two-layer hierarchical modulation. This can occur if the enhancement layer is rotated. In order to minimize BER when Euclidean distance profile is changed in hierarchical modulation, the bits-to-symbol mapping can be re-done or performed again, as shown in FIGS. 24 and 25. FIG. 24 is an exemplary diagram illustrating a new QPSK/QPSK hierarchical modulation. Moreover, FIG. 25 is another exemplary diagram illustrating a new QPSK/QPSK hierarchical modulation.

Figure 26:
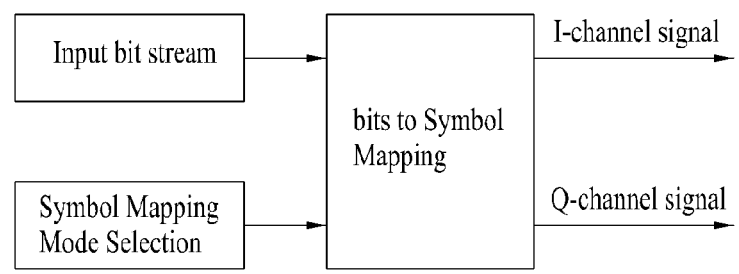
FIG. 26 is an exemplary diagram illustrating a new bit-to-symbol block in accordance with one embodiment.

In view of the discussions of above, a new bit-to-symbol generation structure can be introduced. According to the conventional structure, a symbol mapping mode selection was not available. FIG. 26 is an exemplary diagram illustrating a new bit-to-symbol block. Here, the symbol mapping mode can be selected when the bits-to-symbol mapping is performed. More specifically, a new symbol mapping mode selection block can be added for controlling and/or selecting bits-to-symbol mapping rule based on the signal constellation of hierarchical modulation and channel coding used.

A Broadcast Physical Channel (BPC) may comprise one or more sub-band interlace multiplex tuples (SIMTs). For each sub-band, each interlace may be identified by an interlace-index, and referred to as interlace i, where i denotes the interlace-index. Each interlace may be further divided into a number of multiplexes. The number of multiplexes on interlace i is denoted by MultiplexesPerInterlace_k,i for example.

A multiplex on interlace i may be identified by a multiplex-index, and referred to as multiplex j (of interlace i), where j= 0, . . . , MultiplexesPerInterlace_k,i—1 denotes the multiplex-index. The pair of indices (k, i, j) is called an sub-band interlace-multiplex index. For example, the interlace-multiplex index (0, 0, 3) identifies multiplex 3 of interlace 0 on sub-band 0. A sub-band interlace-multiplex tuple defines a quantum of bandwidth over the Broadcast Physical Channel. An sub-band interlace-multiplex tuple is defined by its sub-band index, interlace-index, multiplex-index, and the burst length in units of slots of the multiplex.

Figure 27:
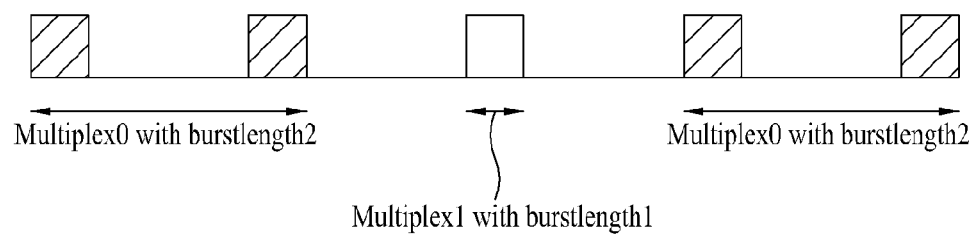
FIG. 27 illustrates an exemplary interlace in a sub-band with 2 multiplexes in accordance with one embodiment.

The burst length of an interlace-multiplex pair with index (k, i, j) may denoted by BurstLength_k,i,j, for example, and defined as the number of slots occupied by each transmission of the sub-band interlace-multiplex pair. FIG. 27 shows an example of (0,0,0) and (0,0,1). MultiplexesPerInterlace_0, 0=2, BurstLength_0,0,0=2 and BurstLength_0,0,1=1 by way of example.

If more than one SIMTs are in a BPC, they can be from the same or different sub-bands. SIMTs for the same sub-band in a BPC may be from the same interlace. Unlike DO BCMCS, the SIMT may be defined consistently across the one or more zones. BPC may be also defined consistently across the zone for the purpose of over-the-air combining of the overhead messages and traffic headers. This over-the-air combining is also referred to as single frequency network (SFN) operation wherein sectors (transmitting the same information content) transmit w/the same physical layer waveform which yields SFN or soft-combining gains at the terminal receiver. Sectors may exclude some particular SIMTs from each BPC, in order to use them for the unicast traffic and guard bands.

In one embodiment, a SIMT assigned to a BPC may not be assigned to another BPC. A logical channel may have full or partial resource from one or many BPCs. In a BOC the AN specifies the interlace multiplex structure for each sub-band (i.e., the number of multiplexes for each interlace and the burst length for each multiplex). In a BOC the AN specifies the SIMTs in each BPC. BPCs may be indexed by the order of appearance in the message, for example. SIMTs which are not assigned to any BPC are assumed to carry unicast traffic or for guard band purpose.

The SIMTs, allocated to a BPC announced in BOC, may be defined as the union of SIMTs allocated to the BPC by each sector. In a BOC and in a MAC capsule header, the AN specifies the indices of the BPCs associated with the logical channel, and the allocated resource in each BPC (e.g., the portion in each SIMT). It also has a field to indicate that AT may read BOC and BroadcastChannelInfo message before interpreting the header because of the changes in BPC configuration (i.e. SIMTs in a BPC), SIMT structures across the zone, or the changes of BPC configuration in the particular sector.

The BroadcastChannelInfo message (non-BCMCS) provides the SIMTs which was allocated to BCMCS in BOC but not used by this sector. Such SIMTs are used for unicast traffic and guard bands. The BOC itself can also be variable-rate by using BroadcastChannelInfo to assign variable amount of SIMTs to BPCs carrying the BOC. In this case, the configuration of BPC carrying the BOC may be included in the BroadcastChannelInfo.

The order of BPCs, in one embodiment, may be determined by the first SIMT assigned to a BPC in the BOC. One or more SIMTs may be ordered in time by for example their appearance in the UF. For the SIMTs which have the same order in time, their orders are determined by the sub-band index. For example, the 1st SIMT for BPC_A is (x+1,y,z), the 1st SIMT for BPC_B is (x,y+1,z). BPC_A may send a MAC packet comprising an error control block (ECB) row which is above the ECB row contained in the MAC packet transmitted on BPC_B. In one exemplary embodiment, the 1st SIMT for BPC_A is (x,y,z), the 1st SIMT for BPC_B is (x+1,y,z), and BPC_A may send a MAC packet containing an ECB row which is above the ECB row contained in the MAC packet transmitted on BPC_B. A turbo encoder output bits for a BPC filling up the allocated portions of SIMTs is based on the order of appearance in the definition of the BPC, which is conveyed in BOC.

Figure 28:
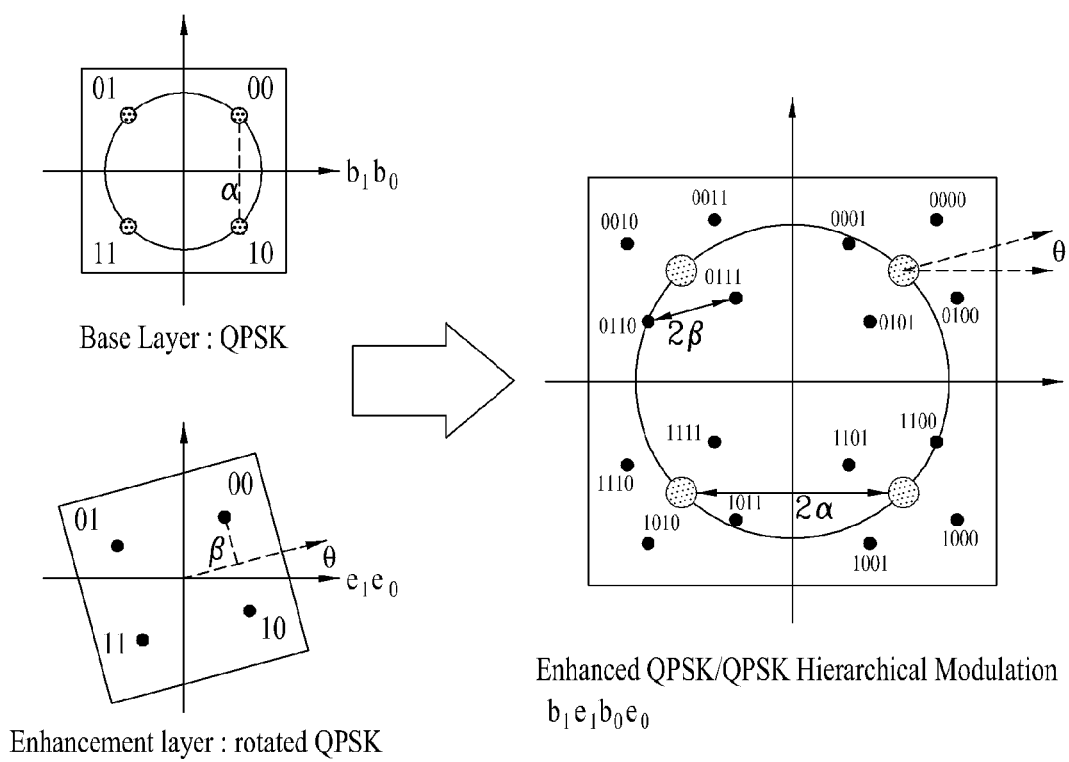
FIG. 28 illustrates an exemplary signal constellation for enhanced hierarchical modulation in accordance with one embodiment.

If a SIMT defined for a BPC is not used by a sector, the sector may not transmit BCMCS signals on the SIMT, such that the order of encoder output bits is not affected as they fill up the BPC based on the definition in BOC (i.e., the union of all resources). The definition of a BPC in BOC may also contain the configuration of modulation symbol rotation in the enhancement layer. FIG. 28 provides an example of hierarchical modulation using the enhancement layer in accordance with one embodiment.

In accordance with one embodiment, the access network may send one or more broadcast parameters in a message (e.g., BroadcastChannelInfo message) to provide an access terminal or other receiving terminal with the mapping between logical channels and BPCs. Such message may have a number of fields associated with a set of values as presented in the exemplary table shown in FIG. 29. In one embodiment, one of the fields in the message may provide information about the rotation angle, and another field may provide information about whether the former is included in the message.

For example, a value of 1 may indicate that the rotation angle is included in the message, and a value of 0 may indicate that the rotation angle is not present.

In accordance with one embodiment, multiple symbols may be allocated to a first signal constellation and to a second signal constellation, such that the first signal constellation refers to base layer signals and the second signal constellation refers to enhancement layer signals. The multiple symbols of the first signal constellation and the second signal constellation may be then modulated and transmitted according to configuration information provided in a message transmitted over a control channel, for example.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting more than one signal in a wireless communication system, the method comprising:
    allocating multiple symbols to a first layer signal constellation and a second layer signal constellation, wherein the first layer signal constellation refers to base layer signals and the second layer signal constellation refers to enhancement layer signals;
    modulating the multiple symbols of the first layer signal constellation and the second layer signal constellation, wherein the multiple symbols of the second layer signal constellation are rotated by a rotation angle determined based on an optimal rotation angle provided by a receiver; and
    transmitting the modulated symbols to the receiver,
    wherein configuration information used for modulating the multiple symbols is provided to the receiver in a control message, wherein the configuration information comprises an indicator indicating whether the rotation angle by which the multiple symbols of the second layer signal constellation are rotated is included in the control message, and further comprises the rotation angle if the indicator indicates that the rotation angle is included in the control message.

2. The method of claim 1, wherein the control message is transmitted over a control channel.

3. The method of claim 1, wherein the configuration information comprises data indicating that modulation of the multiple symbols is enhanced.

4. The method of claim 1, wherein the rotation angle indicates a degree by which an initial reference phase for the enhancement layer signals is modulated.

5. The method of claim 1, wherein the control message comprises:
    a modulation segment used for indicating how the first and second layer signal constellations are modulated and scaled; and
    a modulation segment used for indicating how the second layer signal constellation is enhanced.

6. An apparatus for transmitting more than one signal in a wireless communication system, the system comprising:
    a first logic unit for allocating multiple symbols to a first layer signal constellation and a second layer signal constellation, wherein the first signal constellation refers to base layer signals and the second signal constellation refers to enhancement layer signals;
    a second logic unit for modulating the multiple symbols of the first layer signal constellation and the second layer signal constellation, wherein the multiple symbols of the second layer signal constellation are rotated by a rotation angle determined based on an optimal rotation angle provided by a receiver; and
    a third logic unit for transmitting the modulated symbols to the receiver,
    wherein configuration information used for modulating the multiple symbols is provided to the receiver in a control message, wherein the configuration information comprises an indicator indicating whether the rotation angle by which the multiple symbols of the second layer signal constellation are rotated is included in the control message, and further comprises the rotation angle if the indicator indicates that the rotation angle is included in the control message.

7. The apparatus of claim 6, wherein the control message is transmitted over a control channel.

8. The apparatus of claim 6, wherein the configuration information further comprises data indicating that modulation of the multiple symbols is enhanced.

9. The apparatus of claim 6, wherein the rotation angle indicates a degree by which an initial reference phase for the enhancement layer signals is modulated.

10. The apparatus of claim 6, wherein the control message comprises a modulation segment used for indicating how the first and second layer signal constellations are modulated and scaled.

11. The apparatus of claim 6, wherein the control message comprises a modulation segment used for indicating how the second layer signal constellation is enhanced.

* * * * *